(12) United States Patent
Edgar et al.

(10) Patent No.: US 11,384,161 B2
(45) Date of Patent: Jul. 12, 2022

(54) AMPHIPHILIC POLYSACCHARIDES, POLYSACCHARIDE-BASED HYDROGELS, AND METHODS OF MANUFACTURE

(71) Applicant: Virgina Tech Intellectual Properties, Inc., Blacksburg, VA (US)

(72) Inventors: Kevin Edgar, Blacksburg, VA (US); Brittany L. B. Nichols, Blacksburg, VA (US); Junyi Chen, Blacksburg, VA (US); Charles Frazier, Blacksburg, VA (US); Ann Norris, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 16/961,555

(22) PCT Filed: Jan. 11, 2019

(86) PCT No.: PCT/US2019/013354
§ 371 (c)(1),
(2) Date: Jul. 10, 2020

(87) PCT Pub. No.: WO2019/140304
PCT Pub. Date: Jul. 18, 2019

(65) Prior Publication Data
US 2021/0047440 A1 Feb. 18, 2021

Related U.S. Application Data

(60) Provisional application No. 62/616,102, filed on Jan. 11, 2018, provisional application No. 62/616,130, filed on Jan. 11, 2018, provisional application No. 62/616,124, filed on Jan. 11, 2018.

(51) Int. Cl.
| | | |
|---|---|---|
| *C08B 37/08* | (2006.01) | |
| *C08B 37/02* | (2006.01) | |
| *C08B 31/18* | (2006.01) | |
| *C08B 31/12* | (2006.01) | |
| *C08B 11/04* | (2006.01) | |
| *C08J 3/24* | (2006.01) | |
| *C08B 33/04* | (2006.01) | |
| *C08B 11/20* | (2006.01) | |

(52) U.S. Cl.
CPC .......... *C08B 37/003* (2013.01); *C08B 11/04* (2013.01); *C08B 11/20* (2013.01); *C08B 31/12* (2013.01); *C08B 31/185* (2013.01); *C08B 33/04* (2013.01); *C08B 37/0021* (2013.01); *C08J 3/24* (2013.01)

(58) Field of Classification Search
CPC ......... C08B 11/04; C08B 11/20; C08B 31/12; C08B 31/185; C08B 33/04; C08J 3/075; C08J 3/24

See application file for complete search history.

(56) References Cited

U.S. PATENT DOCUMENTS

| | | |
|---|---|---|
| 3,769,247 A | 10/1973 | Grover et al. |
| 7,879,994 B2 | 2/2011 | Buchanan et al. |
| 2014/0378532 A1 | 12/2014 | Russo et al. |

FOREIGN PATENT DOCUMENTS

WO     2008007153 A2     1/2008

OTHER PUBLICATIONS

Hongtao, T. et al "Synthesis, optimization, characterization and property of oxidized hydroxypropyl mung bean starch" J. Food Processing Preservation, vol. 41, pp. 1-10. (Year: 2017).*
Machado, G. et al "Solid polymeric electrolytes . . . " Nonlinear Opt., Quant. Opt., vol. 32, pp. 141-148. (Year: 2004).*
Cai, Y. et al "A hyaluronic acid-based hydrogel . . . " J. Contr. Res., vol. 253, pp. 153-159. (Year: 2017).*
Li., J. et al "pH and glucose dually responsive injectable hydrogel . . . " J. Polym. Sci., Part A: Polym. Sci., vol. 53, pp. 1235-1244. (Year: 2015).*
(Edgar, Kevin J. et al.) Co-pending application No. PCT/US19/1335, filed Jan. 11, 2019, specification, claims, and figures.
Basu, A.; Kunduru, K. R.; Abtew, E.; Domb, A. J., Polysaccharide-Based Conjugates for Biomedical Applications. Bioconjugate Chemistry 2015, 26 (8), 1396-1412.
Co-Pending application No. PCT/US19/13354, International Search Report and Written Opinion, dated May 15, 2019, 16 pages.
Co-Pending application No. PCT/US19/13354, Invitation to Pay Additional Fees, dated Mar. 27, 2019, 2 pages.
Dong, Y.; Mosquera-Giraldo, L. I.; Taylor, L. S.; Edgar, K.J., Amphiphilic Cellulose Ethers Designed for Amorphous Solid Dispersion via Olefin Cross-Metathesis. Biomacromolecules 2015, 17, 454-465.

(Continued)

*Primary Examiner* — Leigh C Maier
(74) *Attorney, Agent, or Firm* — New River Valley IP Law, PC; Michele L. Mayberry

(57) ABSTRACT

A method for the synthesis of alkyl ω-carboxy(hydroxyethyl) polysaccharides is described. The method includes methylating or ethylating a polysaccharide or providing a methylated or ethylated polysaccharide, hydroxyethylating the methylated or ethylated polysaccharide, and oxidizing the hydroxyethylated polysaccharide to form the ω-carboxy (hydroxyethyl) polysaccharide. A method for the synthesis of oxidized polysaccharides is also described. The method includes hydroxypropylating a polysaccharide and oxidizing the hydroxypropylated polysaccharides. A method for the production of a solid capable of forming a hydrogel is also described. The method includes combining a first solution comprising an oxidized oligo(hydroxypropyl) polysaccharide bearing one or more ketone groups with a second solution comprising an amine substituted polysaccharide to form a third solution, and removing solvent from the third solution to form the solid, or adding an additional solvent to the third solution to precipitate the solid. Novel polysaccharides and hydrogels prepared according to these methods are also described.

11 Claims, 15 Drawing Sheets

(56) References Cited

OTHER PUBLICATIONS

Dong, Yifan et al. Amphiphilic hydroxyalkyl cellulose derivatives for amorphous solid dispersion prepared by olefin cross-metathesis. Polym. Chem. 2016, 7, 4953-4963.

Duncan, R., The dawning era of polymer therapeutics. Nat. Rev. Drug Discov. 2003, 2 (5), 347-360.

Klemm, D.; Heublein, B.; Fink, H. P.; Bohn, A., Cellulose: Fascinating biopolymer and sustainable raw material. Angew. Chem. Int. Ed. 2005, 44 (22), 3358-3393.

Koschella, A et al. Unconventional Methyl Galactan Synthesized via the Thexyldimethylsilyl Inermediate: Preparation, Characterization, and Properties. Macromolecular Bioscience, vol. 8, 2008, pp. 96-105, p. 97, col. 2, paragraph 4; p. 98, figure 2.

Savjani, K. T.; Gajjar, A. K.; Savjani, J. K., Drug Solubility: Importance and Enhancement Techniques. ISRN Pharmaceutics 2012, 2012, 195727.

Shen, L.; Patel, M. K., Life cycle assessment of polysaccharide materials: a review. J. Polym. Environ. 2008, 16(2), 154-167.

Titcombe, LA. Chemically modified cotton liners: preparation and paper making properties. Jul. 1992, pp. 1-269 [online], [retrieved on Feb. 22, 2019]. Retrieved from the internet ; p. 5, paragraph 3; p. 5, figure 1.5.

Ummartyotin, S.; Manuspiya, H., A critical review on cellulose: from fundamental to an approach on sensor technology. Renewable andSustainable Energy Reviews 2015, 41, 402-412.

Vasconcelos, T.; Sarmento, B.; Costa, P., Solid dispersions as strategy to improve oral bioavailability of poor water soluble drugs. Drug Discov. Today 2007, 12 (23), 1068-1075.

D'Souza, A. J. M.; Topp, E. M., Release from polymeric prodrugs: Linkages and their degradation. Journal of Pharmaceutical Sciences 2004, 93 (8), 1962-1979.

Domb, A. J., et al. Nystatin-Dextran Conjugates: Synthesis and Characterization. Journal of Polymer Science: Part A: Polymer Chemistry, vol. 34, 1229-1236 (1996).

Edgar, K. J.; Bucbanan, C. M.; Debenham, J. S.; Rundquist, P. A.; Seiler, B. D.; Shelton, M.C.; Tindall, D., Advances in cellulose ester performance and application. Prog Polym. Sci. 2001, 26 (9), 1605-1688.

Fox, S. C.; Edgar, K. J., Staudinger Reduction Chemistry of Cellulose: Synthesis of Selectively O-Acylated 6-Amino-6-deoxycellulose. Biomacromolecules 2012, 13 (4), 992-1001.

Hussain, M. A.; Abbas, K.; Jantan, I.; Bukhari, S. N. A., Polysaccharide-based materials in macromolecular prodrug design and development. International Materials Reviews 2017, 62 (2), 78-98.

Ilevbare, G. A.; Liu, H.; Edgar, K. J.; Taylor, L. S., Impact of polymers on crystal growth rate of structurally diverse compounds from aqueous solution. Mol. Pharmaceut. 2013, 10 (6), 2381-2393.

Ilevbare, G. A.; Liu, H.; Edgar, K. J.; Taylor, L. S., Maintaining supersaturation in aqueous drug solutions: impact of different polymers on induction times. Cryst. Growth Des. 2012, 13 (2), 740-751.

Khandare, J.; Minko, T., Polymer-drug conjugates: Progress in polymeric prodrugs. Progress in Polymer Science 2006, 31 (4), 359-397.

Li, D.; Han, J. D.; Ding, J. X.; Chen, L.; Chen, X. S., Acid-sensitive dextran prodrug: A higher molecular weight makes a better efficacy. Carbohydrate Polymers 2017, 161, 33-41.

Liu, H.; Ilevbare, G. A.; Cherniawski, B. P.; Ritchie, E. T.; Taylor, L. S.; Edgar, K. J., Synthesis and structure-property evaluation of cellulose ω-carboxyesters for amorphous solid dispersions. Carbohydr. Polym. 2012, 10 pages.

Liu, H.; Taylor, L. S.; Edgar, K. J., The role of polymers in oral bioavailability enhancement; a review. Polymer 2015, 77, 399-415.

Mosquera-Giraldo, L. I.; Borca, C. H.; Meng, X; Edgar, K.J.; Slipchenko, L. V.; Taylor, L. S., Mechanistic Design of Chemically Diverse Polymers with Applications in Oral Drug Delivery. Biomacromolecules 2016, 17 (11), 3659-3671.

Nichifor, M.; Mocanu, G., Polysaccharide-Drug Conjugates as Controlled Drug Delivery Systems. In Polysaccharides for Drug Delivery and Pharmaceutical Applications, American Chemical Society: 2006; vol. 934, pp. 289-303.

Piapied, L.; Duhem, N.; des Rieux, A.; Preat, V., Fate of polymeric nanocarriers for oral drug delivery. Current Opinion in Colloid & Interface Science 2011, 16 (3), 228-237.

Zhu, L.; Kumar, V.; Banker, G. S., Examination of oxidized cellulose as a macromolecular prodrug carrier: preparation and characterization of an oxidized cellulose-phenylpropanolamine conjugate. International Journal of Pharmaceutics 2001, 223 (1), 35-47.

* cited by examiner n = 10-10,000
m = 1-20

AMPHIPHILIC POLYSACCHARIDES, POLYSACCHARIDE-BASED HYDROGELS, AND METHODS OF MANUFACTURE

CROSS-REFERENCE TO RELATED APPLICATIONS

The present application is a National Stage application under 35 U.S.C. § 371 of International Application No. PCT/US19/13354, filed Jan. 11, 2019, which application relies on the disclosures of and claims priority to and the benefit of the filing dates of U.S. Provisional Application Nos. 62/616,130, 62/616,102, and 62/616,124, each filed on Jan. 11, 2018, the disclosures of which are hereby incorporated by reference herein in their entireties.

BACKGROUND OF THE INVENTION

Field of the Invention

The present invention generally relates to the field of polymers used in biopharmaceutical applications such as drug delivery. More particularly, embodiments of the present invention relate to novel amphiphilic polysaccharides, polysaccharide-based hydrogels, and methods of their manufacture.

Description of Related Art

An estimated 40% of currently marketed drugs are characterized as poorly soluble in water, with an estimated 70-90% of new drug candidates also facing this obstacle (see Klemm, D.; Heublein, B.; Fink, H. P.; Bohn, A., Cellulose: Fascinating biopolymer and sustainable raw material. *Angew. Chem. Int. Ed.* 2005, 44 (22), 3358-3393 ("Klemm et al. 2005")). In 2014 it was reported that the average cost of developing a new drug had reached $2.4 billion (see Shen, L.; Patel, M. K., Life cycle assessment of polysaccharide materials: a review. *J Polym. Environ.* 2008, 16(2), 154-167 ("Shen et al. 2008")). Poor aqueous solubility contributes strongly to this huge cost, because it leads to expensive failures of many new drug candidates, inflating the average cost. The problem has only worsened of late, since screening of drug candidates is selective for compounds that are highly hydrophobic, as it is based on strength of binding to hydrophobic biological targets. The problem is further exacerbated as drug development chemists select highly crystalline candidates so that candidate purity can be assured. Low solubility is a major problem because it can directly affect bioavailability (the weight percent of the administered dose that reaches the bloodstream intact). Drug companies seek to overcome low bioavailability by increasing the drug dose, and/or by more frequent administration to reach the desired therapeutic benefit. Patient care is thus impeded due to increased cost, increased risk of negative side effects, higher variability both between doses and between patients, and poor patient compliance. Solving issues of poor solubility and resultant poor bioavailability is a leading challenge to the pharmaceutical industry. In order to overcome this issue, development of safe and effective delivery systems that enhance aqueous solubility is essential.

Amorphous solid dispersion (ASD) can be used to overcome poor aqueous solubility by incorporating a drug into a polymer matrix. This traps the drug in a high energy, metastable amorphous state. In addition to increasing solubility, ASD formulations can improve drug stability by maintaining the amorphous state that can inhibit drug recrystallization. Upon exposure to aqueous media in the gastrointestinal tract, these ASD formulations can create supersaturated solutions (see Baird, J. A.; Taylor, L. S., Evaluation of amorphous solid dispersion properties using thermal analysis techniques. *Adv. Drug Deliv. Rev.* 2012, 64 (5), 396-421; Ilevbare, G. A.; Liu, H.; Edgar, K. J.; Taylor, L. S., Maintaining supersaturation in aqueous drug solutions: impact of different polymers on induction times. *Cryst. Growth Des.* 2012, 13 (2), 740-751; and Ilevbare, G. A.; Liu, H.; Edgar, K. J.; Taylor, L. S., Impact of polymers on crystal growth rate of structurally diverse compounds from aqueous solution. *Mol. Pharmaceut.* 2013, 10 (6), 2381-2393 ("Ilevbare et al. 2013"). ASD will thus enhance both drug solubility and its permeation through the gastrointestinal epithelium, and thereby enhance bioavailability (see Vasconcelos, T.; Sarmento, B.; Costa, P., Solid dispersions as strategy to improve oral bioavailability of poor water soluble drugs. *Drug Discov. Today* 2007, 12 (23), 1068-1075; and Liu, H.; Taylor, L. S.; Edgar, K. J., The role of polymers in oral bioavailability enhancement; a review. *Polymer* 2015, 77, 399-415 ("Liu et al. 2015")).

Cellulose is a useful natural polymer as the framework for materials for biomedical applications, due to the fact that it is a benign and sustainable resource (see Edgar, K. J.; Buchanan, C. M.; Debenham, J. S.; Rundquist, P. A.; Seiler, B. D.; Shelton, M. C.; Tindall, D., Advances in cellulose ester performance and application. *Prog. Polym. Sci.* 2001, 26 (9), 1605-1688; Klemm at al. 2005; Shen et al. 2008; and Ummartyotin, S.; Manuspiya, H., A critical review on cellulose: from fundamental to an approach on sensor technology. *Renewable and Sustainable Energy Reviews* 2015, 41, 402-412) Cellulose ω-carboxyesters (see Ilevbare et al. 2013; Liu, H.; Ilevbare, G. A.; Cherniawski, B. P.; Ritchie, E. T.; Taylor, L. S.; Edgar, K. J., Synthesis and structure-property evaluation of cellulose ω-carboxyesters for amorphous solid dispersions. *Carbohydr. Polym.* 2014, 100, 116-125 ("Liu et al. 2014"); Mosquera-Giraldo, L. I.; Borca, C. H.; Meng, X; Edgar, K. J.; Slipchenko, L. V.; Taylor, L. S., Mechanistic Design of Chemically Diverse Polymers with Applications in Oral Drug Delivery. *Biomacromolecules* 2016, 17 (11), 3659-3671) and ethers (see Dong, Y; Mosquera-Giraldo, L. I.; Troutman, J.; Skogstad, B.; Taylor, L. S.; Edgar, K. J., Amphiphilic hydroxyalkyl cellulose derivatives for amorphous solid dispersion prepared by olefin cross-metathesis. Polym. Chem. 2016, 7, 4953-4963; and Dong, Y; Mosquera-Giraldo, L. I.; Taylor, L. S.; Edgar, K. J., Amphiphilic Cellulose Ethers Designed for Amorphous Solid Dispersion via Olefin Cross-Metathesis. *Biomacromolecules* 2015, 17, 454-465) have been used in ASD formulations with a structurally diverse array of drugs including quercetin, clarithromycin, rifampin, ellagic acid, etravirine, and ritonavir. These studies have led to the analysis of structure-property relationships critical for effective ASD performance (see Edgar, K. J.; Taylor, L. S., Impact of polymers on crystal growth rate of structurally diverse compounds from aqueous solution. *Mol. Pharmaceut.* 2013, 10 (6), 2381-2393; Liu et al. 2015; Liu et al. 2014). Important polymer features include 1) a balance of hydrophobic/hydrophilic moieties to ensure miscibility with hydrophobic drugs, 2) at least slight water solubility to enable drug release; 3) free carboxyl groups to provide interactions such as hydrogen bonding with drug molecules and provide pH-triggered drug release, and 4) high glass transition temperature (Tg; preferably >100° C.) for sufficient thermal stability and to maintain the formulation in the glassy state at ambient temperature, even when humidity is high, ambient temperature is relatively high, and/or when the drug happens to be a plasticizer for the polymer.

This understanding of important structure-property relationships has led to major advances in ASD polymer development. However, a critical limitation remains; current methods required for ASD polymer preparation are expensive, time-consuming, and/or are fraught with synthetic difficulties. Thus, there is a need in the art for improved ASD polymer technology which addresses these limitations.

Oral drug administration is the most recognized and utilized form of drug delivery to the human body (see Klein, S., Polysaccharides in Oral Drug Delivery—Recent Applications and Future Perspectives. In *Polysaccharide Materials: Performance by Design*, American Chemical Society: 2009; Vol. 1017, pp 13-30). It has been estimated that approximately 85% of the highest value drugs in the United States and Europe are delivered through oral administration (see Savjani, K. T.; Gajjar, A. K.; Savjani, J. K., Drug Solubility: Importance and Enhancement Techniques. *ISRN Pharmaceutics* 2012, 2012, 195727 ("Savjani et al. 2012")). Some of the advantages of oral drug administration are as follows: high patient compliance, cost-effectiveness, low or no need for dosing by medical professionals, low sterility constraints, flexibility in dosage design, and the ability to create a controlled dosing schedule (see Savjani et al. 2012; and Piapied, L.; Duhem, N.; des Rieux, A.; Preat, V., Fate of polymeric nanocarriers for oral drug delivery. *Current Opinion in Colloid & Interface Science* 2011, 16 (3), 228-237 ("Piapied et al. 2011")). In addition to these benefits, oral drug administration is convenient, which increases patient compliance (see Liu et al. 2014). Oral self-administration is painless and less expensive compared to other delivery routes (see Piapied et al. 2011; and Liu et al. 2014). Oral drug administration also eliminates the possibility of disease transmission that is possible with parenteral drug delivery (see Piapied et al. 2011). Critical drawbacks of oral administration include the poor aqueous solubility of many drugs and drug candidates, and their resulting low bioavailability (see Liu et al. 2014). Permeation through gastrointestinal membranes is essential for drugs to enter blood circulation and for effective permeation to occur, the drug must be in solution. An estimated 40% of existing drugs and 90% of pipeline drug candidates have poor aqueous solubility (see Hauss, D. J., Oral lipid-based formulations. *Advanced Drug Delivery Reviews* 2007, 59 (7), 667-676). This is due to the current drug development process which is selective for drug candidates that are highly crystalline and hydrophobic (see Liu et al. 2014). Drug candidates are often screened against hydrophobic receptor binding sites to evaluate their binding constants. Hydrophobic candidates are therefore selected as promising due to their increased binding affinity. The development of delivery systems to overcome these factors leading to poor bioavailability is crucial to improving the pipeline to successful pharmaceuticals. Oral bioavailability is defined as the amount of intact drug absorbed into systemic circulation expressed as a percent of the administered dose (see Francis, M. F.; Piredda, M.; Cristea, M.; Winnik, F. M., Synthesis and Evaluation of Hydrophobically-Modified Polysaccharides as Oral Delivery Vehicles for Poorly Water-Soluble Drugs. In *Polymeric Drug Delivery I*, American Chemical Society: 2006; Vol. 923, pp 55-67). Drugs with poor aqueous solubility need to be administered at higher doses in order to achieve therapeutic plasma concentration (see Savjani et al. 2012).

Polymeric prodrugs are one way to overcome barriers to drug delivery (see Khandare, J.; Minko, T., Polymer-drug conjugates: Progress in polymeric prodrugs. *Progress in Polymer Science* 2006, 31 (4), 359-397; ("Khandare and Minko 2006")). A prodrug is an inactivated form of a drug that is converted into the active form while inside the body (see Khandare and Minko 2006). This process of converting the inactive prodrug form to the active drug form is known as prodrug reconversion (see Khandare and Minko 2006), or biotransformation. Prodrug reconversion is commonly achieved by either chemical or enzymatic hydrolysis of the bond between the pro-moiety (protecting molecule) and the parent molecule (active drug) (see Khandare and Minko 2006; and Nichifor, M.; Mocanu, G., Polysaccharide-Drug Conjugates as Controlled Drug Delivery Systems. In *Polysaccharides for Drug Delivery and Pharmaceutical Applications*, American Chemical Society: 2006; Vol. 934, pp 289-303). Thus conversion of a drug to a prodrug, and utility of that prodrug in the body, can be characterized as a two-step process of derivatization and biotransformation. Polymers are one category of pro-moieties that can be conjugated to a drug. These polymer-drug conjugates are referred to as polymeric prodrugs. Some of the notable benefits of utilizing polymeric prodrugs are: increasing aqueous solubility of poorly soluble drugs, protecting active drug from being deactivated or chemically modified during transport to the active site, and the ability to provide either passive or active targeting to the drug's site of action (see Khandare and Minko 2006). Targeted drug delivery is a critical benefit of polymeric prodrugs. Many drug candidates fail to pass the clinical phase of development because they are incapable of reaching the targeted site in a therapeutic concentration (see Park, J. H.; Saravanakumar, G.; Kim, K.; Kwon, I. C., Targeted delivery of low molecular drugs using chitosan and its derivatives. *Advanced Drug Delivery Reviews* 2010, 62 (1), 28-41 ("Park et al. 2010")). During administration, a significant amount of the drug is distributed to non-target organs and tissues. This leads to potentially dangerous side effects for the patient that can be mediated by targeting moieties and designing materials with triggered release in the target environment (see Park et al. 2010).

Targeted delivery systems have three major components: a targeting moiety, a carrier (the polymer), and a therapeutic agent (the active drug) (see Khandare and Minko 2006; and Park et al. 2010). Active targeting for polymeric prodrugs is achieved by attaching a ligand intended to bind at the active site as the targeting moiety (see D'Souza, A. J. M.; Topp, E. M., Release from polymeric prodrugs: Linkages and their degradation. *Journal of Pharmaceutical Sciences* 2004, 93 (8), 1962-1979 ("D'Souza and Topp 2004")). Passive targeting of polymeric prodrugs is sometimes used in treatment of tumors. It has been established that large molecules that undergo extended systemic circulation have a tendency to accumulate in tumors. This is referred to as the enhanced permeation and retention effect (see D'Souza and Topp 2004). A typical example of targeted delivery of a polymeric prodrug is the lysosomotropic delivery of antibiotics where the material is internalized by endocytosis and transported by the lysosomes to the target (see Duncan, R., The dawning era of polymer therapeutics. *Nat Rev Drug Discov* 2003, 2 (5), 347-360). The active compound is then released through the pH triggering of the lysosomal environment.

In addition to the three components, polymeric delivery vehicles must possess reactive groups available for drug conjugation, be non-toxic, be biocompatible with target tissues, lack immunogenicity, and be effectively metabolized or excreted by the body (see Nichifor, M.; Mocanu, G., Polysaccharide-Drug Conjugates as Controlled Drug Delivery Systems. In *Polysaccharides for Drug Delivery and*

*Pharmaceutical Applications*, American Chemical Society: 2006; Vol. 934, pp 289-303 and Zhu, L.; Kumar, V.; Banker, G. S., Examination of oxidized cellulose as a macromolecular prodrug carrier: preparation and characterization of an oxidized cellulose-phenylpropanolamine conjugate. *International Journal of Pharmaceutics* 2001, 223 (1), 35-47). Polysaccharides tend to have low toxicity, are abundant in nature, and in some cases are readily broken down and excreted, which makes them useful starting materials for biomedical applications (see Basu, A.; Kunduru, K. R.; Abtew, E.; Domb, A. J., Polysaccharide-Based Conjugates for Biomedical Applications. *Bioconjugate Chemistry* 2015, 26 (8), 1396-1412 ("Basu et al. 2015")). Conjugation of a hydrophobic drug to an amphiphilic polysaccharide backbone can increase the aqueous drug solubility. Polymeric delivery vehicles can also be used for controlled release of the drug through enzymatic cleavage or pH triggered release by terminal carboxyl groups (see Basu et al. 2015; and Li, D.; Han, J. D.; Ding, J. X.; Chen, L.; Chen, X. S., Acid-sensitive dextran prodrug: A higher molecular weight makes a better efficacy. *Carbohydrate Polymers* 2017, 161, 33-41). There is a need in the art for improved polymeric drug delivery vehicles based on polysaccharides.

Hydrogels are crosslinked polymer networks with very high affinity for water. Hydrogels are soft materials that are used in many applications which include drug delivery, lubricants, food, crop protection, surgery, and adhesives. Currently, most hydrogels are made by using low to moderate molecular weight crosslinking reagents, which may have inherent toxicity as a result of inevitable incomplete crosslinking of the hydrogel, and the reactive, multivalent nature of the crosslinker that may result in crosslinking of polymers in the body and/or in nature. As a result, these toxic crosslinkers can limit application of hydrogels in medical fields, or any fields where there is human and/or environmental exposure to the hydrogel. There is a need in the art for improved hydrogels which overcome these limitations.

SUMMARY OF THE INVENTION

According to one embodiment, the present invention provides a method for the synthesis of alkyl ω-carboxy (hydroxyethyl) polysaccharides. The method generally includes methylating or ethylating a polysaccharide or providing a methylated or ethylated polysaccharide, hydroxyethylating the methylated or ethylated polysaccharide, and oxidizing the hydroxyethylated polysaccharide to form the ω-carboxy(hydroxyethyl) polysaccharide.

According to another embodiment, the present invention provides a method for the synthesis of oxidized polysaccharides. The method generally includes hydroxypropylating a polysaccharide and oxidizing the hydroxypropylated polysaccharide.

According to another embodiment, the present invention provides a method for the production of a solid capable of forming a hydrogel. The method generally includes combining a first solution comprising an oxidized oligo(hydroxypropyl) polysaccharide bearing one or more ketone groups with a second solution comprising an amine substituted polysaccharide to form a third solution, and removing solvent from the third solution to form the solid, or adding an additional solvent to the third solution to precipitate the solid.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention. Note that schematic diagrams showing reaction schemes are not intended to imply regioselectivity unless stated otherwise.

DETAILED DESCRIPTION OF VARIOUS EMBODIMENTS OF THE INVENTION

Figure 1A:
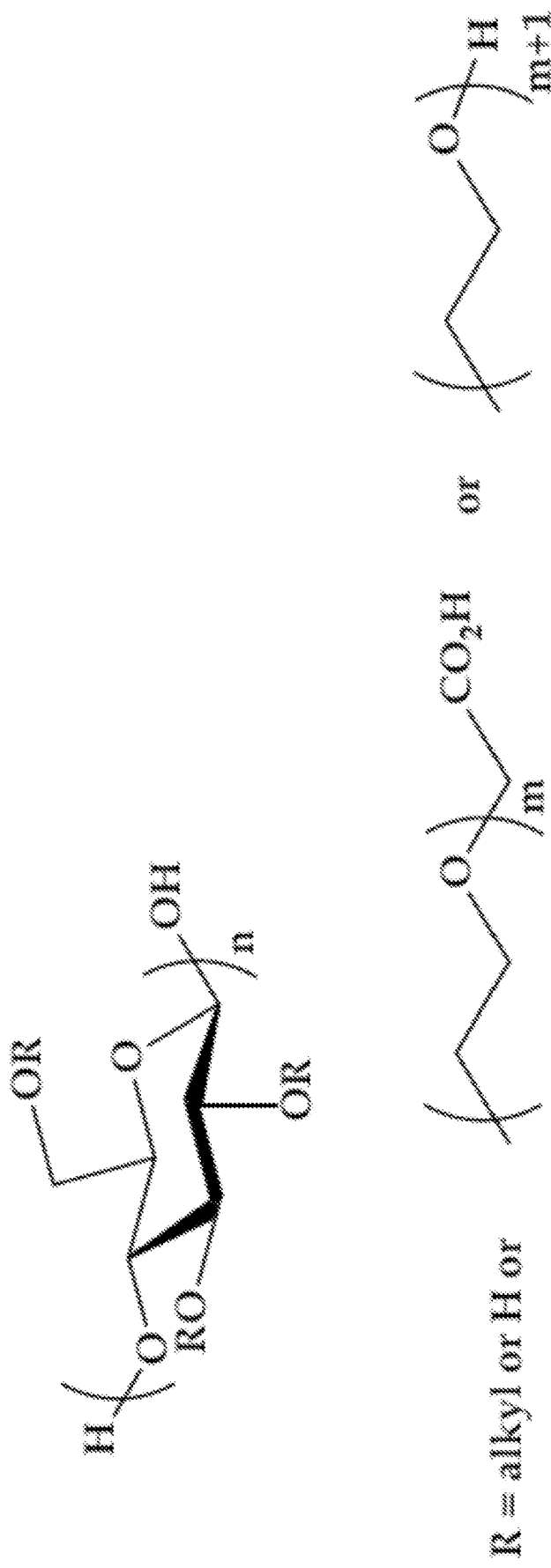
FIG. 1A is a schematic diagram showing a generic polysaccharide starting material that can be used in the general synthesis reaction shown in FIG. 1B. The diagram generically represents any known polysaccharide.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used herein, "room temperature" includes temperatures in the range of about 20 degrees Celsius to about 25 degrees Celsius.

As used in the specification and drawings, the term "alkyl" refers to a hydrocarbon radical derived from an alkane by removal of a hydrogen atom, such as $C_nH_{2n+1}$, where n is a number from 1-50, which hydrocarbon can be substituted or unsubstituted with any substituent(s) known in the art, including a substituted or unsubstituted C1-C20, C2-C10, C3-C6, C3-C15, C4-C25, C5-C8, C6-C18, or C7-C30 hydrocarbon, and so on.

Hydrophobic Modification and Selective Oxidation of Hydroxyethyl Cellulose

The present inventors have invented a novel synthetic route for ASD polymers that is brief, simple, and efficient, and can be easily scaled up to the commercial level. The present inventors hypothesized that hydrophobic modification and TEMPO mediated oxidation of hydroxyethyl polysaccharide derivatives would give polymers with ideal amphiphilicity and controllable DS of terminal carboxyl groups. The present inventors furthermore hypothesized that their synthetic approach would be a useful tool to tailor ASD polymers to be miscible with a wide range of drugs based on the balance of hydroxyethyl and alkyl substituents. Further, pH responsive terminal carboxyl-containing cellulose derivatives will be useful for the development of controlled release formulations that will benefit the treatment of chronic illness.

The present inventors have demonstrated for the first time the synthesis of alkyl ω-carboxy(hydroxyethyl) polysaccharides as well as a process for preparing them. In one embodiment, the present invention provides a method for the synthesis of alkyl ω-carboxy(hydroxyethyl) polysaccharides, comprising: 1) methylating or ethylating a polysaccharide or providing a methylated or ethylated polysaccharide, 2) hydroxyethylating the methylated or ethylated polysaccharide, and 3) oxidizing the hydroxyethylated polysaccharide to form the ω-carboxy(hydroxyethyl) polysaccharide.

According to embodiments, the present invention provides a synthetic scheme comprising a series of reactions used to generate novel amphiphilic polymers that can be used in drug formulations such as amorphous solid dispersions (ASD). According to one embodiment, this synthetic route comprises a series of three reactions: 1) synthesis of methyl cellulose (MC) and ethyl cellulose (EC) from cellulose; 2) synthesis of methyl hydroxyethyl cellulose (MHEC) from methyl cellulose (MC) and ethyl hydroxyethyl cellulose (EHEC) from ethyl cellulose (EC); and 3) TEMPO oxidation of MHEC and EHEC to yield Ox-EHEC and Ox-MHEC. These steps will be provided in further detail below. Further, the Example below provides a proof of concept which illustrates one particular embodiment.

Synthesis of Methyl Cellulose (MC) and Ethyl Cellulose (EC) from Cellulose

According to one embodiment, microcrystalline cellulose is used as a starting material in the synthetic route. However, appropriate starting materials can include other polysaccharides such as amylose, dextran, chitin, chitosan, alginate, pullulan, curdlan, and hyaluronic acid. The microcrystalline cellulose (or other polysaccharide) can be dissolved in a solvent such as dimethylacetamide (DMAc), lithium chloride (LiCl), a combination of DMAc/LiCl, or other solvents known to dissolve microcrystalline cellulose. Then, the reactant sodium hydride (95%) is added, followed by the reactant methyl iodide or ethyl iodide added dropwise. According to other embodiments, sodium hydroxide is used in substitution of sodium hydride, and methyl chloride or ethyl chloride are used in substitution of methyl iodide or ethyl iodide. The reaction can be allowed to proceed at room temperature for about 24 hours and then to about 50° C., such as 25° C. to 75° C., 30° C. to 70° C., 35° C. to 65° C., 40° C. to 60° C., 45° C. to 55° C., or any range encompassing these values. The resulting products are methyl cellulose (MC) and ethyl cellulose (EC).

According to embodiments, the additional reactants are added at least in an amount that is equivalent to the microcrystalline cellulose (or other polysaccharide) starting material based on reaction stoichiometry (1 equiv). According to other embodiments, the additional reactants are added in excess of the microcrystalline cellulose starting material, such as at 2 equiv, 3 equiv, 4 equiv, 5 equiv, 6 equiv, 7 equiv, 8 equiv, 9 equiv, 10 equiv, or more.

Reaction of EC and MC

According to embodiments, the dried EC or MC can then be dispersed in Tetrahydrofuran (THF) or other suitable solvent under nitrogen. The resulting solution can be heated to around 50° C., such as 25° C. to 75° C., 30° C. to 70° C., 35° C. to 65° C., 40° C. to 60° C., 45° C. to 55° C., or any range encompassing these values. The solution can be mechanically stirred to dissolve the polymer for at least about 0.5 hour, 1 hour, 1.5 hour, 2.0 hour, or more. Then, the reactant sodium hydride (95%) can be gradually added and stirred until completely dissolved, at which point the reactant 2-chloroethanol can be added dropwise. According to other embodiments, sodium hydroxide can be used in substitution of sodium hydride and ethylene oxide can be used in substitution of 2-chloroethanol. Further, one of skill in the art can contemplate other chlorinated alcohols and ethers which would work. The reaction mixture can be allowed to stir for at least 12 hours, and preferably at least 24 hours or longer. Then the product (MHEC or EHEC) can be collected by precipitation into hexanes or other suitable solvent, and then dried such as under vacuum at 40° C. or higher.

According to embodiments, the additional reactants are added at least in an amount that is equivalent to the EC or MC starting material based on reaction stoichiometry (1 equiv). According to other embodiments, the additional reactants are added in excess of the EC or MC starting material, such as at 2 equiv, 3 equiv, 4 equiv, 5 equiv, 6 equiv, 7 equiv, 8 equiv, 9 equiv, 10 equiv, or more.

TEMPO Oxidation of MHEC and EHEC

According to one embodiment, MHEC or EHEC can be dissolved in deionized water. The reagent 2,2,6,6-tetramethylpiperidin-1-yl)oxyl (TEMPO) can then be added to the solution of MHEC or EHEC. Once TEMPO is fully dissolved, NaBr can be added to the reaction mixture, and the mixture cooled such as at 2° C. A NaOCl solution (such as a 15% NaOCl solution) brought to pH 9.4 with 4M HCl can be cooled in an ice bath, and a NaOH solution (such as a 0.5M NaOH solution) can also be cooled in an ice bath. Alternatively, NaOBr can be used instead of NaOCl. Then, the NaOCl and NaOH solutions can be added dropwise to the reaction mixture such that a pH of about 9 such as 9.4 is maintained, over approximately 1 hour or longer. The reaction can be quenched with methanol or similar solvent and neutralized with HCl such as a 4M HCl solution. Once quenched, $NaBH_4$ can be added and the reaction mixture stirred for several hours such as overnight. The mixture can then be acidified with HCl to bring the pH to 6. The acidified solution can be dialyzed against deionized water for at least one day, such as two days or longer, and then freeze dried to recover the product (Ox-EHEC or OX-MHEC). Information on the amounts of the reactants can be obtained in the non-limiting Example. While not intended to be limiting, these serve as guidance for a skilled artisan to reproduce the method in their hands.

According to embodiments, the present invention provides novel alkyl ω-carboxy(hydroxyethyl) polysaccharides and processes for synthesis of carboxyl-containing polysaccharides. Carboxyl-containing polysaccharides, including amphiphilic derivatives as described here, have great utility in many application fields. Such applications include controlled release of drugs, crop protection chemicals, nutraceuticals, and other active compounds. Such applications also include use in personal care formulations. Additional applications include use in formulations that require water-soluble and/or water dispersible polymers that can impact rheology and dispersion, such as coatings, adhesives, cements, and other products used in the household, in personal care, in mining, drilling, or similar manufacturing operations, and other aqueous formulations. Carboxyl-containing polysaccharides are outstanding candidates for many aspects of drug delivery including amorphous solid dispersion for enhancing water solubility and bioavailability of otherwise poorly aqueously soluble drugs.

The compounds and methods described herein can be used for essentially any polysaccharide that can be hydroxyethylated. This would include cellulose, amylose, dextran, chitin, chitosan, alginate, pullulan, curdlan, hyaluronic acid, and many others. Other substituents can be present as well; for example, one could begin with commercial ethyl cellulose or methyl cellulose, then hydroxyethylate as taught herein, then oxidize as taught herein.

Hydrophobic Modification and Selective Oxidation of Hydroxyethyl Cellulose: Example Experimental Materials Microcrystalline cellulose (Avicel) ($M_w$~90 kg/mol), methyl iodide, ethyl iodide, 2chloroethanol, 2,2,6,6-tetramethyl-1-piperidinyloxy (TEMPO), and sodium hypochlorite were purchased from Sigma Aldrich. Tetrahydrofuran (THF), dimethyl sulfoxide (DMSO), sodium bromide, and dialysis tubing (MW cutoff 3.5 kDa) were from Fisher Scientific.

Measurements $^1H$ NMR spectra were acquired on either a Bruker Avance II spectrometer operating at 500 MHz or an Agilent MR4 operating at 400 MHz. $^{13}C$ NMR spectra was acquired on a Bruker Avance II spectrometer operating at 500 MHz. Sample (ca. 10 mg for proton and 50 mg for carbon NMR) was dissolved in 1 mL deuterated $CDCl_3$, (or $D_2O$) and sonicated to ensure complete dissolution. FT-IR was performed on a Nicolet 8700 instrument using potassium bromide powder as matrix (ca. 1 mg polymer in 100 mg KBr).

Synthesis of Methyl Cellulose (MC) and Ethyl Cellulose (EC)

Vacuum-dried microcrystalline cellulose (1 g, 0.48=01 AGU, 1.44=01 OH) was dissolved in DMAc/LiCl according to a previously published procedure (see Fox, S. C.; Edgar, K. J., Staudinger Reduction Chemistry of Cellulose: Synthesis of Selectively 0-Acylated 6-Amino-6-deoxy-cellulose. *Biomacromolecules* 2012, 13 (4), 992-1001). Sodium hydride (95%, 5 equiv) was added followed by the dropwise addition of methyl iodide or ethyl iodide (5 equiv). DS (Me/Et)=0.8, determined by $^1H$ NMR integration of alkyl group peaks and cellulose backbone proton peaks.

EC: $^1H$ NMR (500 MHz, $CDCl_3$): 3.10-4.52 ppm (cellulose backbone, $O(C\underline{H}_2CH_2O)_mCOCH=CH_2+CH_2$ ethyl group), 1.12 ppm (CH3 ethyl group), yield 0.954 g, 91%

MC: $^1H$ NMR (500 MHz, $CDCl_3$): 3.10-4.52 (cellulose backbone, $OCH_2CH(CH_3)OCH_2CH(CH_3)OCOCH=CH_2$), 2.10 ppm $CH_3$, yield 0.912 g, 89%

Reaction of EC and MC with 2-chloroethanol

Dried EC (or MC) (200 mg, 0.72 mmol AGU, 2.16 mmol-OH) was dispersed in THF under nitrogen. The solution was heated to 50° C., and held at that temperature for an hour as the polymer gradually dissolved under mechanical stirring. Sodium hydride (95%, 5 equiv) was added gradually and the mixture was stirred until the NaH had completely dissolved. Once the NaH was fully dissolved, 2-chloroethanol (6.20 mL, 5 equiv) was added dropwise. The reaction mixture was allowed to stir for 24 h. The product was collected by precipitation into hexanes, then was vacuum-dried at 40° C. DS (HE) was determined after acetylation by the ratio between the integral of the methyl protons and the hydroxyethyl group $CH_2$ protons of the resulting ester.

Ethyl hydroxyethyl (HE) cellulose (EHEC; yield: 85%): $^1H$ NMR (500 MHz, $CDCl_3$): 2.87-5.09 (cellulose backbone, $O(C\underline{H}_2CH_2O)_mCOCH=CH_2$), Methyl HE cellulose (MHEC; yield: 85%): $^1H$ NMR (500 MHz, $CDCl_3$): 2.87-5.09 (cellulose backbone, $O(C\underline{H}_2CH_2O)_mCOCH=CH_2$), 4.20 $(O(CH_2C\underline{H}_2O)_mCOCH=CH_2)$, 5.88 $(O(CH_2CH_2O)_mCOCH=C\underline{H}_2)$, 6.16 $(O(CH_2CH_2O)_mCOC\underline{H}=CH_2)$ and 6.29 $(O(CH_2CH_2O)_mCOCH=C\underline{H}_2)$.

TEMPO oxidation of MHEC and EHEC

MHEC or EHEC (1.00 g) was dissolved in DI $H_2O$ (100 mL), then (2,2,6,6-tetramethylpiperidin-lyl)oxyl (TEMPO; 0.020 g, 0.13 mmol) was added. Once TEMPO was fully dissolved, NaBr (0.01 g, 0.95 mmol) was added to the reaction mixture. The reaction mixture was cooled to 2° C. A 15% NaOCl solution (6 mL, 12.5 mmol) was brought to pH 9.4 with 4M HCl and cooled in an ice bath. A 0.5 M NaOH solution was also prepared and cooled in the ice bath. The NaOCl solution was added dropwise to the reaction mixture while maintaining a pH of 9.4 by concomitantly adding the 0.5M NaOH solution, over 1 h. The reaction was quenched by adding 5 mL of methanol and neutralizing with 4M HCl. Once quenched, $NaBH_4$ (0.25 g, 6.5 mmol) was added and the reaction mixture stirred overnight. The mixture was then brought to pH 6 with 4M HCl. This solution was dialyzed against DI $H_2O$ for 2 days, then the product was recovered by freeze drying.

Ethyl ω-carboxy(hydroxyethyl) cellulose (Ox-EHEC): $^1H$ NMR (500 MHz, $D_2O$): 3.10-4.62 ppm (cellulose backbone, $O(C\underline{H}_2CH2O)_mCOCH=CH_2+CH_2$ ethyl group+$CH_2CH_2$ hydroxyethyl group), 1.12 ppm ($CH_3$ ethyl group), yield 0.987 g, 89%.

Methyl ω-carboxy(hydroxyethyl) cellulose (OxMHEC): $^1H$ NMR (500 MHz, $D_2O$): 2.94-5.65 ppm (cellulose backbone, $O(CH_2CH_2O)_mCOCH=CH_2+CH_2$ ethyl group+ $CH_2CH_2$ hydroxyethyl group), 2.21 ppm ($CH_3$), yield 0.847 g, 78%.

Results and Discussion

Hydroxyethyl cellulose (HEC) is synthesized commercially by reacting cellulose with ethylene oxide by ring-opening of the epoxide. This generates oligo(hydroxyethyl) side chains, each of which bears a primary terminal hydroxyl group with greater reactivity than the secondary cellulose OH groups of the anhydroglucose ring. The present inventors hypothesized that these primary hydroxyl groups could be selectively oxidized to give carboxylic acids at the termini of the oligo(hydroxyethyl) side chains. Such carboxyl groups would be advantageous for pH triggered drug release and for increasing hydrogen bonding with drugs in amorphous solid dispersion (ASD). They would also be useful for preparing polysaccharide ethers with the ability to dissolve or disperse in aqueous media, enabling a wide variety of new applications. However, oligo(hydroxyethyl) side chains are quite hydrophilic, which could limit miscibility with poorly soluble, hydrophobic drugs. The present inventors hypothesized that they could modify the polysaccharide backbone with methyl or ethyl substituents to increase hydrophobicity, in order to increase polymer amphiphilicity and polymer-drug miscibility, using conditions highly compatible (aqueous solvent, alkaline media) with the hydroxyethylation and oxidation steps. Previous structure-property relationship studies have shown that polymers with an overall amphiphilic nature are the most promising for ASD applications. Thus, the present inventors' synthetic strategy was to create a simple route to novel amphiphilic polymers exploiting the increased reactivity of terminal hydroxyls on HEC. The present inventors achieved this in the laboratory in a synthetic route (FIG. 1B) that allows them to fully control the degree of substitution (DS) of alkyl groups (methyl or ethyl), hydroxyethyl groups, and terminal carboxyls, simply by stoichiometric control. FIG. 1A shows the starting material can be any polysaccharide, not just cellulose, including amylose, dextran, chitin, chitosan, alginate, pullulan, curdlan, hyaluronic acid, and many others. For example, cellulose can contain an ethyl or methyl as the alkyl group (exemplary degrees of substitution can include DS 0.1-2, most preferred 0.5-1), and a terminally oxidized oligo(hydroxyethyl) group (exemplary degrees of substitution can include DS 0.5-2, most preferred 0.8-1.5; oxidized to carboxylic acid as in FIG. 1A). The starting material can also contain the same substituents but on the other polysaccharides recited above and/or with longer chain alkyl groups (e.g. 3-6 carbon, etc.; exemplary degrees of substitution can include DS 0.1-2, most preferred 0.5-1).

The sequence of steps in the present inventors' new process is important, for reasons that will elucidated herein. The present inventors began their proof of concept work by reacting commercial microcrystalline cellulose with methyl iodide or ethyl iodide in the presence of NaH base. These products had good solubility in THF, thereby simplifying subsequent reaction with 2-chloroethanol in the presence of NaH base catalyst, in THF. In this second step the present inventors can control the DS and molar substitution (MS) by altering the number of molar equivalents of NaH and 2-chloroethanol used per anhydroglucose (AHG), as well as by modifying reaction time. The product of this step is soluble both in organic solvents (DMSO, ethanol) and water. Thus, the present inventors could use water as solvent for the TEMPO-catalyzed oxidation to yield the final products. In this oxidation reaction, NaOCl was used as the re-oxidant so as to maintain the concentration of the primary, selective TEMPO oxidant.

Figure 2:
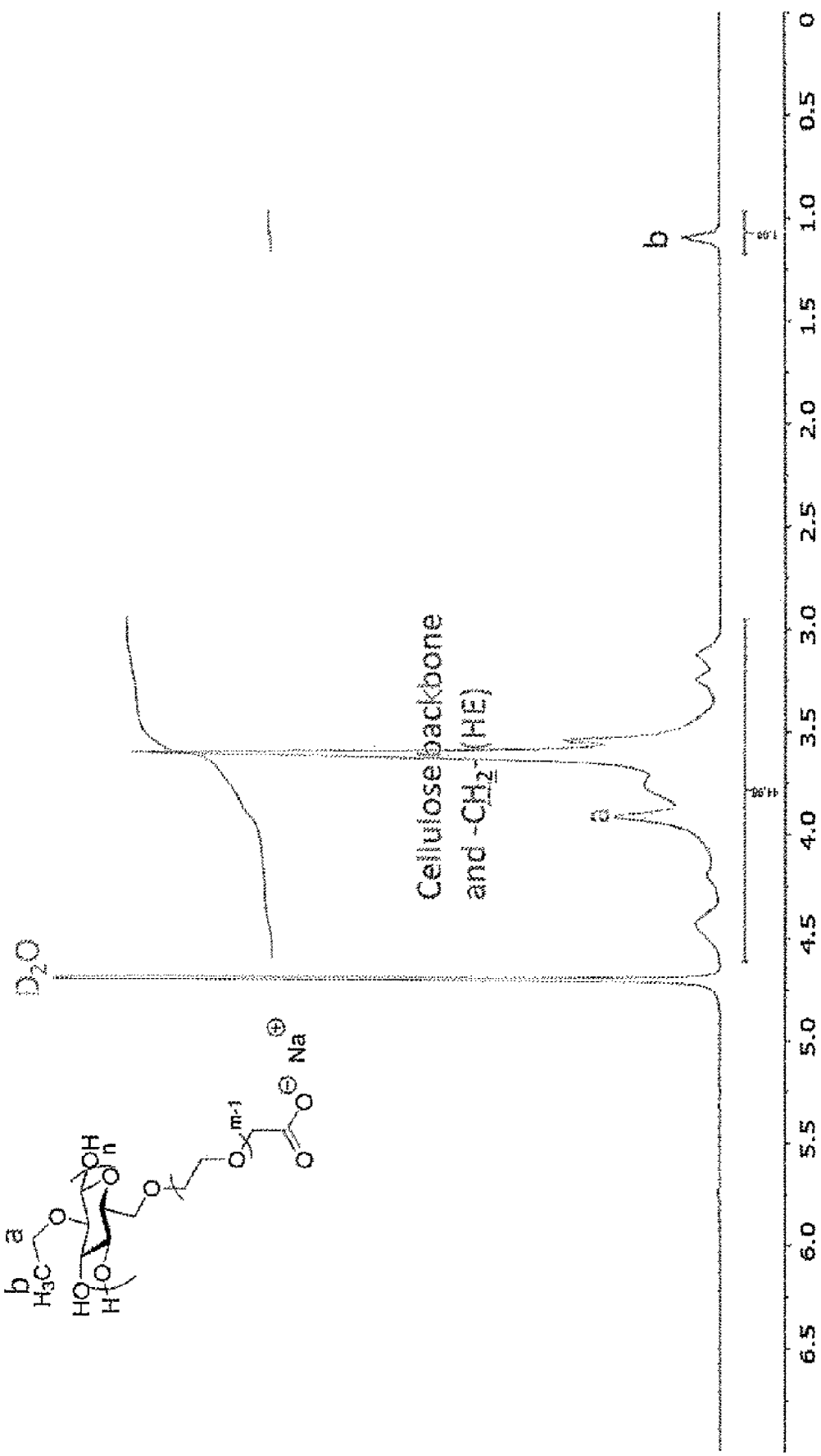
FIG. 2 is a $^1$H NMR spectrum of the TEMPO oxidized product (Ox-EHEC) according to an embodiment.

FIG. 2 shows the $^1$H NMR spectrum of the TEMPO oxidized product, ethyl ω-carboxy(hydroxyethyl) cellulose (Ox-EHEC) with DS(Et) 0.75 and DS (HE) 1.0. In FIG. 2, the present inventors see distinct peaks at 1.12 ppm and at 3.85 ppm corresponding to the —$CH_3$ and —$CH_2$— protons, respectively, of the ethyl substituent. In the TEMPO oxidized product, the present inventors see no peaks in the aldehyde region, indicating that the oligo(hydroxyethyl) terminal hydroxyl groups are oxidized fully to carboxylic acids. The present inventors further confirmed the successful selective oxidation of primary hydroxyls to carboxylic acids by $^{13}$C NMR spectroscopy, which shows the C=O carbon at 178 ppm and by FT-IR, which shows a strong carboxyl carbonyl peak at 1650 $cm^4$.

It is important to note that the present inventors' proof of concept work uses some solvents and reagents that are well-suited to the laboratory, but not necessarily to a manufacturing operation. The present inventors intentionally select three reactions that all will work in aqueous alkaline media, and that they believe in some context that are used are currently in use in cellulose derivative manufacturing today.

Figure 1B:
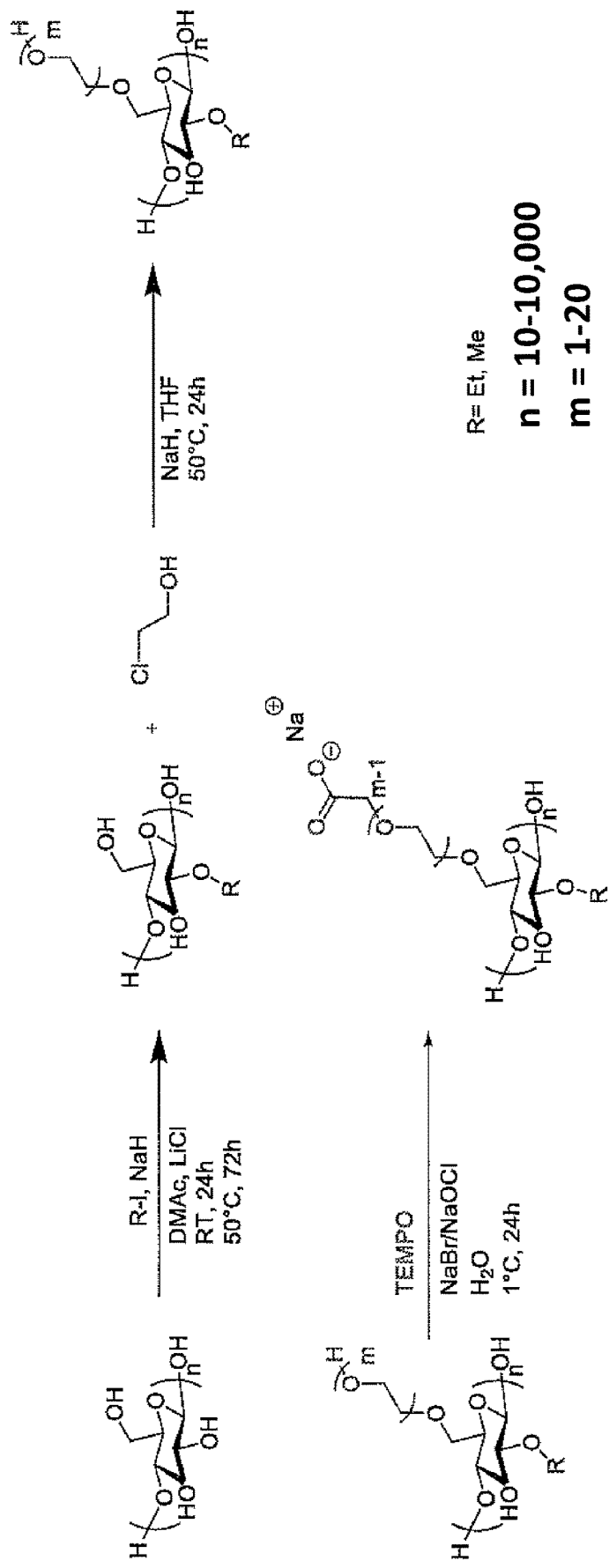
FIG. 1B is a schematic diagram showing the general synthesis of EC/MC hydroxyethyl derivatives followed by TEMPO oxidation according to an embodiment. Note that the diagram is not intended to imply regioselectivity of either alkylation or hydroxyethylation; structures are depicted as they are simply for clarity and reader understanding.
Figure 3:
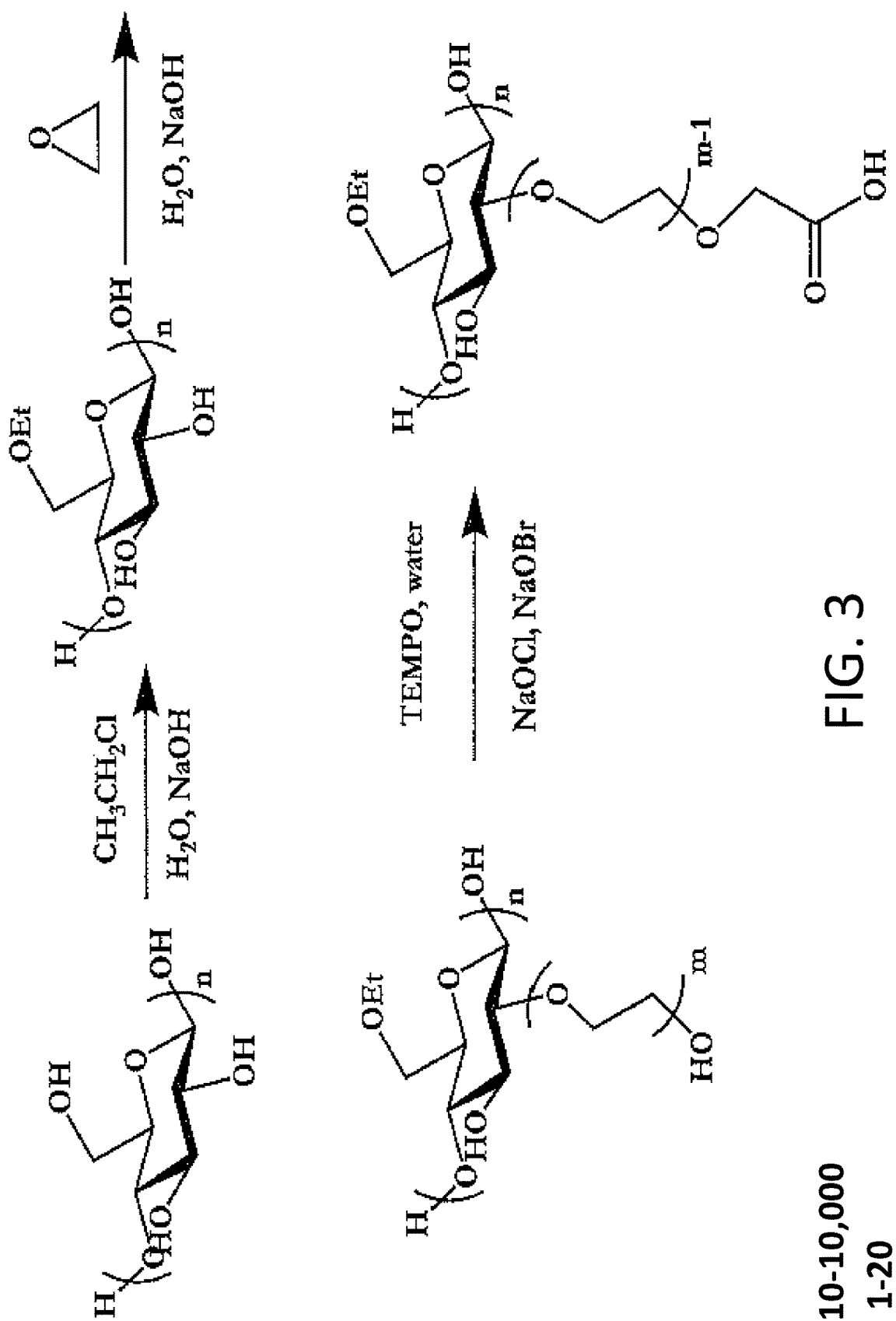
FIG. 3 is a schematic diagram of a commercial route to Ox-EHEC according to an embodiment.

FIG. 3 shows an embodiment of the present inventors' planned manufacturing scheme, closely patterned on their proof of concept chemistry shown in FIG. 1B. Note that the ethylation or methylation step uses the solvent and reagents that are used commercially to make ethyl and methyl cellulose (the present inventors depict ethylation with ethyl chloride; methylation commercially uses methyl chloride). The hydroxyethylation step uses solvent and reagents that are used commercially to make hydroxyethyl cellulose. The TEMPO oxidation uses solvent and reagents that are used commercially to oxidize the surface of cellulose nanofibers. Note also that, while one might postulate that the product could also be made by combining existing methods, e.g. by carboxymethylation of ethyl hydroxyethyl cellulose (e.g. reaction with $ClCH_2CO_2H$ in $H_2O$/NaOH), this would be incorrect. It is likely that the final product contains some monosaccharides in which the C-6 primary hydroxyl did not get reacted with either the alkylating reagent (e.g. $CH_3Cl$) or the hydroxyethylating reagent (ethylene oxide, EO), and so was available for oxidation by TEMPO/NaOCl. As a result, there is likely to be a low concentration of uronic acid monosaccharides in the product, unlike in the putative carboxymethylation product. Second, selective carboxymethylation of the termini of the oligo(hydroxyethyl) side chains would be impractical. Carboxymethylation reaction with glucose ring hydroxyls would also occur, creating carboxymethyl substituents in places where they do not in the present inventors' product, and where they may be far less effective with regard to ASD, due to steric hindrance from the cellulose main chain. Thus, the present inventors' compositions are unique, as is their process.

Note also the significance of the order of the steps. Thus, initial hydroxyethylation (EO) followed by reaction with an alkylating reagent (e.g. $CH_3Cl$) would result in methylation not only of the hydroxyls of the glucose ring, but also of the oligo(hydroxyethyl) terminal hydroxyls. Therefore fewer, or perhaps none, of these terminal hydroxyls would be available for oxidation to carboxylic acids. A sequence of hydroxyethylation (EO), then oxidation, then alkylation (e.g. $CH_3CH_2Cl$) would also not yield the same final product as depicted in FIG. 3. The final alkylation step would preferentially alkylate the carboxyl groups (which would be fully anionic) rather than the ring hydroxyl groups, thus resulting in methyl ester substituents rather than the desired methyl ethers, and resulting in a deficit of the critically important carboxyl groups. Thus, the present inventors' innovative chemical sequence is well designed for synthesis of the target polymers.

Conclusions

The present inventors have demonstrated a novel, efficient and cost effective synthetic route to new, useful, amphiphilic cellulose derivatives for drug delivery applications such as amorphous solid dispersion, and for many other water-soluble or water-dispersible polymer applications. Further, due to fully controllable DS of hydrophobic and hydrophilic substituents and excellent aqueous and organic solubility, they may be attractive polymers for other industrial uses such as coatings. This strategy can be applied and easily scaled up in a manufacturing facility as a green, efficient process, using only water as solvent, and employing relatively low-cost process and materials.

Oxidized Polysaccharides for Biomedical Applications

Polysaccharides with β-D glucose structure such as cellulose have three free hydroxyl groups located at the C2, C3 and C6 positions. While C2 and C3 are sterically hindered, the primary C6 position is more accessible for functionalization and conjugation with bioactives. Synthetic strategies such as etherification and esterification are also essential to the modification of these hydroxyl groups (see Hussain, M. A.; Abbas, K.; Jantan, I.; Bukhari, S. N. A., Polysaccharide-based materials in macromolecular prodrug design and development. International Materials Reviews 2017, 62 (2), 78-98). Hydroxyalkyl cellulose derivatives are commonly used in biomedical applications. In this specification, the present inventors utilize hydroxypropyl cellulose (HPC) and the analogous dextran derivative as starting materials for amphiphilic pro-active delivery systems through selective oxidation and Schiff base chemistry. The present inventors hypothesize that the terminal secondary alcohols of oligo (hydroxypropyl) side chains of hydroxypropyl polysaccharide derivatives can be selectively oxidized to ketones, which can readily react with primary amines to form Schiff base pro-active polymer delivery systems. Amphiphilic derivatives of cellulose and dextran can increase the aqueous solubility and regulate the release of bioactive molecules when used as carriers. Selective oxidation of the terminal hydroxypropyl groups of oligo(hydroxypropyl) polysaccharides to ketones has never before been demonstrated, and thus of course their conversion to Schiff bases by reaction with amines has not been demonstrated. Both the oxidized dextran and cellulose derivatives, and their Schiff base adducts with amines, are new families of materials. Use of these oxidized hydroxyalkyl polysaccharide derivatives to synthesize novel amphiphilic delivery materials has not been previously demonstrated. Utilizing secondary alcohols on hydroxypropyl substituents can lead to a wide range of possible polysaccharide based prodrug moieties with the capability to easily fine tune amphiphilicity. In this specification, the present inventors provide proof of concept of the selective oxidation chemistry, and that an imine (Schiff base) can be reliably formed between the resulting ketones on oxidized derivatives of hydroxypropyl cellulose and the amine moiety of p-aminobenzoic acid (PABA) as a model pro-active. The present inventors further demonstrate application of this chemistry to hydroxypropyl dextran, as dextran derivatives will be highly useful in biomedical applications, due in part to the ability of the body to metabolize and clear dextran. Dissolution studies can be used to test the imine bond pH responsiveness of the polymer-drug conjugate, and to quantify drug release by HPLC. The present inventors hypothesize that conjugates of amine-containing actives with oxidized hydroxypropyl polysaccharides will have significantly enhanced solubility, and be capable of pH triggered release at pH ~5 through imine hydrolysis. The present inventors further hypothesize that this synthetic strategy will be especially useful for the development of prodrug treatments for cancer, by targeting the acidic intracellular microenvironment of tumors.

Aqueous solubility and controllable release are essential for bioactive compounds. In the case of oral drug delivery, poor aqueous solubility of a drug can lead to low bioavailability (the percentage of an administered dose that reaches the systemic circulation intact), especially for Biopharmaceutical Classification System Class II drugs. For poorly bioavailable drugs, higher doses are required to achieve a therapeutic concentration in the systemic circulation. This can in turn have negative consequences for the patient; higher drug costs, increased side effects, and higher variability between doses and between patients. There can also be higher environmental impact due to the portion of the dose that is not absorbed, but rather ends up in the waste treatment system, and in some cases makes it through to aquifers. The aqueous solubility and release rate of a bioactive molecule can be improved in some cases by conjugation to a carrier molecule, to form a polymeric pro-drug delivery system. Polysaccharides have great potential as carriers since they are biodegradable, tend to have low toxicity, and are fully renewable and sustainable.

The present inventors have developed a novel process which is selective, practical, and economical, affording oxidized, amphiphilic polysaccharide derivatives as carrier molecules for delivery of bioactive molecules. The present inventors employ oligo(hydroxypropyl) cellulose (also known as hydroxypropyl cellulose, or HPC) and oligo (hydroxypropyl) dextran (also called hydroxypropyl dextran, or HPD) as examples in this disclosure, but many other hydroxypropyl polysaccharides would also be suitable substrates, as would polysaccharides containing other secondary alcohol substituents. The secondary alcohols of the terminal hydroxypropyl moieties of the oligo(hydroxypropyl) substituents are selectively oxidized with sodium hypochlorite (NaOCl). These secondary alcohols are oxidized to ketones, so that the product has oligo(hydroxypropyl) side chains terminated by an acetone moiety. These products (oxidized hydroxypropyl cellulose, or Ox-HPC, and oxidized hydroxypropyl dextran, or Ox-HPD) can then be reacted with primary amines to form Schiff base imines. The present inventors demonstrate these reactions with primary amines as models for drugs and other bioactive species. The resulting Schiff bases are stable when dry, but hydrolyze slowly in neutral aqueous solutions, and hydrolyze quickly under aqueous acidic conditions. This acid sensitivity can be advantageous for the lysosomotropic delivery of antibiotics as well as for targeted delivery to tumors. Here, the present inventors report the synthesis, characterization and physical properties of amphiphilic cellulose and dextran Schiff base delivery systems with successful drug conjugation confirmed by Fourier transform infrared spectroscopy (FTIR), and proton and carbon nuclear magnetic resonance spectroscopy ($^1$H and $^{13}$C NMR). The present inventors also evaluate and quantify the pH triggered release of active compounds by high pressure liquid chromatography (HPLC).

The present inventors have demonstrated for the first time the synthesis of novel ketone substituted polysaccharides and processes for preparing novel ketone substituted polysaccharides based on selective oxidation of oligo(hydroxypropyl) polysaccharides. In one embodiment, the present invention provides a method for the synthesis of ketone substituted polysaccharides, comprising 1) hydroxypropylating a polysaccharide and 2) oxidizing the hydroxypropylated polysaccharide. The method can also include reacting the oxidized hydroxypropylated polysaccharide with a primary amine to form an amine-conjugated oxidized polysaccharide.

According to embodiments, the present invention provides a synthetic scheme comprising a series of reactions used to generate novel ketone substituted polysaccharides that can be used as prodrugs and other drug delivery applications. According to one embodiment, this synthetic route comprises a series of three reactions: 1) Synthesis of hydroxypropyl dextran (HPD); 2) Selective oxidation of hydroxypropyl dextran (HPD) or hydroxypropyl cellulose (HPC) to form Ox-HPD or Ox-HPC; and 3) Reaction of Ox-HPC/Ox-HPD with primary amines. These steps will be provided in further detail below. Further, the Example below provides a proof of concept which illustrates one particular embodiment.

Synthesis of Hydroxypropyl Dextran (HPD)

According to one embodiment, dextran is used as a starting material. However, appropriate starting materials can include other polysaccharides such as cellulose, amylose, pullulan, chitin, chitosan, alginate, hyaluronic acid, curdlan, and many others. Dextran (or other polysaccharide) can be dissolved in a solvent such as dimethylacetamide (DMAc), lithium chloride (LiCl), a combination of DMAc/LiCl, or other solvents known to dissolve dextran (or other polysaccharides. Sodium hydride can be added to the reaction mixture and allowed to briefly stir such as 5 minutes. Propylene oxide can then be added dropwise, and the mixture can be stirred at room temperature for one day. The temperature can then be increased such as to about 50° C. such as 25° C. to 75° C., 30° C. to 70° C., 35° C. to 65° C., 40° C. to 60° C., 45° C. to 55° C., or any range encompassing these values. The mixture can then be stirred for several days such as three days at that temperature. The mixture can then be cooled to room temperature. The product (HPD) can then be isolated by precipitation into acetone, filtration, and washing with ethanol and then dried in a vacuum oven or similar method.

According to embodiments, the additional reactants are added at least in an amount that is equivalent to the dextran starting material based on reaction stoichiometry (1 equiv). According to other embodiments, the additional reactants are added in excess of the dextran starting material, such as at 2 equiv, 3 equiv, 4 equiv, 5 equiv, 6 equiv, 7 equiv, 8 equiv, 9 equiv, 10 equiv, or more.

Selective oxidation of hydroxypropyl dextran (HPD) or hydroxypropyl cellulose (HPC) to form Ox-HPD or Ox-HPC HPD or HPC can be dissolved in deionized water, and then NaOCl such as 14.5% NaOCl can then be added with acetic acid. The pH can then be adjusted to about 7 such as 7.4 by addition of pH 7 phosphate buffer. The solution can then be stirred at room temperature for several hours such as 8 hours. The reaction mixture can then be cooled to room temperature and then dialyzed against deionized water for several days such as three days. The product (Ox-HPD or Ox-HPC) can then be collected by freeze drying. Information on the amounts of the reactants can be obtained in the non-limiting Example. While not intended to be limiting, these serve as guidance for a skilled artisan to reproduce the method in their hands.

Reaction of Ox-HPC/Ox-HPD with Primary Amines

Ox-HPC can be dissolved in dimethyl sulfoxide (DMSO), pH 6 phosphate buffer, or other suitable solvent, depending on the particular primary amine reagent used. For example, for reaction with aromatic amines such as PABA, DMSO can be used, and for reaction with alkylamines such as t-butylamine, pH 6 phosphate buffer can be used. While the Example below demonstrates reaction with PABA and t-butylamine, other primary amines known in the art such as methylamine, ethylamine, propylamine, aniline, and so on, can be used. Primary amines can then be added at least at 1 equiv per mmol OH, such as at 2 equiv, 3 equiv, 4 equiv, 5 equiv, 6 equiv, 7 equiv, 8 equiv, 9 equiv, or 10 equiv per mmol of OH or more, and the solution stirred at room temperature for several days such as three days. The reaction mixture can then be dialyzed against deionized water and the product can be collected by freeze drying or similar methodology.

According to embodiments, the present invention provides novel ketone substituted polysaccharides and processes for preparing novel ketone substituted polysaccharides based on selective oxidation of oligo(hydroxypropyl) polysaccharides. There are many hydroxyl groups on oligo (hydroxypropyl) polysaccharides, including those attached directly to the rings (anhydroglucose in the case of cellulose and dextran); for cellulose, the primary OH group at C6, and secondary OH groups at C2 and C3. The present inventors have made the surprising discovery that the inexpensive and powerful oxidant NaOCl, or in other words household bleach, will selectively oxidize the terminal hydroxypropyl secondary alcohol groups to ketones. The products of this oxidation are ketone substituted polysaccharides which are novel materials that would be extremely difficult to make in any other way, but which in any case have never been prepared before. Because these ketone moieties are located at the ends of hydrophilic oligo(hydroxypropyl) chains, the oxidized polymers are relatively hydrophilic and some of these products are soluble in the benign and inexpensive solvent water. In fact, since the starting oligo(hydroxypropyl) polysaccharide can be soluble in water, and the preferred solvent for NaOCl oxidations is water, the oxidation is overall an ecofriendly process.

The present methods encompass all polysaccharides that contain substituents bearing secondary hydroxyl groups. Particularly useful substrates include hydroxypropyl and oligo(hydroxypropyl) polysaccharides, most often synthesized by simple reaction of a natural polysaccharide with propylene oxide in the presence of a base catalyst, for example in aqueous NaOH. These polysaccharide derivatives may bear other substituents that can contribute to amphiphilic properties in the final product, or optimize solvent solubility, or otherwise enhance performance in the desired application. Examples of such substituents would include methyl or ethyl ethers. The scope with regard to starting natural polysaccharide is extremely broad. While examples of cellulose and dextran are described herein, other suitable polysaccharide substrates (after hydroxypropylation) would include amylose, pullulan, chitin, chitosan, alginate, hyaluronic acid, curdlan, and many others.

The oxidized hydroxypropyl polysaccharides provided herein are potentially useful in many ways. Oxidation to the ketone will change the solubility parameter of the polymer, resulting in potentially increased miscibility with less polar polymers. Further, the ketone groups on the products are set up perfectly for reaction with amines. The products of this reaction are imines, such that the polymer is decorated with imine linked moieties. If this amine is a bioactive or otherwise active molecule, the imine linked product then becomes a polymeric pro-drug or pro-active. Because the imine linkage is hydrolytically labile, the polymeric pro-drug will be useful for slow release of drug, and the polymeric pro-active will be useful for slow release of other actives. Many applications for such oxidized polymers and their imine derivatives can be envisaged, but attractive examples include prodrugs for intravenous administration and slow release of drug into the circulation over an extended period of time (for example, drugs for which infrequent administration is a major advantage, like anti-tuberculosis or anti-HIV drugs). Another application that can be envisioned is in agriculture, where the polymer could be used to slowly deliver crop protection chemicals and/or fertilizers linked to the polymer by the imine bonds, from agricultural films, seed coatings, or other polymer forms. These and other applications benefit from the generally benign nature of polysaccharides, their fully renewable and sustainable nature, and their potential for biodegradability. By controlling the degree of substitution of hydroxypropyl groups, the polymer can be designed to contain some unsubstituted monosaccharides. The presence of such unsubstituted monosaccharides can promote polymer biodegradation by natural enzymes, for example degradation of hydroxypropyl cellulose ethers by cellulase enzymes, because these enzymes most effectively recognize and act upon the natural, unsubstituted monosaccharides. For biomedical applications, polysaccharides often do not promote an immune response, and many polysaccharide derivatives are biocompatible with many tissues, thus the inventive polymers described herein are particularly well-suited for such applications.

Oxidized Polysaccharides for Biomedical Applications: Example

Experimental

Materials

Hydroxypropyl cellulose (HPC, Mw~100 kg mol$^{-1}$, DS(HP) 2.2, MS(HP) 4.4), potassium phosphate dibasic ($K_2HPO_4$) and propylene oxide were purchased from Acros Organics. Sodium hydride (95%, NaH), monopotassium phosphate ($KH_2PO_4$), t-butylamine, and acetic acid were purchased from Fisher Scientific. Dextran (from *Leuconostoc mesenteroides*, MW-35,000 kg mol$^{-1}$), p-aminobenzoic acid, and dimethyl sulfoxide were purchased from Sigma Aldrich. Sodium hypochlorite (14.5% available chlorine) was purchased from Alfa Aesar. All reagents were used as received without further purification. Dialysis tubing (molecular weight cutoff 3.5 kDa) was from Fisher Scientific.

Synthesis of Hydroxypropyl Dextran (HPD)

Dextran (1 g, 18.54 mmol) was dissolved in DMAc/LiCl under nitrogen. Sodium hydride (2.22 g, 5 eq) was added to the reaction mixture and allowed to stir for 5 minutes. Then, propylene oxide (5.38 g, 5 eq) was added dropwise. The mixture was stirred at room temperature for one day. The temperature was then increased to 50° C. and the mixture stirred at that temperature for three days. The mixture was cooled to room temperature, then the product was isolated by precipitation into acetone, filtration, and washing with ethanol. It was then dried in a vacuum oven. Yield: 0.974 g, 91%, DS (HP)=0.90, MS (HP)=1.1, $^1$H NMR (500 MHz, $D_2O$): 4.98 ppm (C$\underline{H}$ of HP group), 3.41-4.15 ppm (m, dextran backbone and OC$\underline{H_2}$CHCH$_3$OH), 1.20 ppm (C$\underline{H_3}$ of HP group)

Selective oxidation of hydroxypropyl dextran (HPD) or HPC

HPD (1.00 g; or HPC, 1.00 g, 2.4 mmol AGU) was dissolved in DI water (20 mL), then 20 mL of 14.5% NaOCl was added with 1 mL acetic acid. The pH was adjusted to 7.4 by addition of pH 7 phosphate buffer. The solution was stirred at room temperature for 8 h. The reaction mixture was cooled to room temperature and dialyzed against DI water for 3 days. The product was then collected by freeze drying to afford Ox-HPD (0.878 g, 82% yield; 0.921 g, 86% yield in the case of Ox-HPC).

Ox-HPC: $^1$H NMR (500 MHz, $D_2O$): 3.10-5.40 ppm (cellulose backbone+OC$\underline{H_2}$C$\underline{H}$CH3OH), 2.33 ppm (terminal hydroxyl of un-oxidized hydroxypropyl group, O$\underline{H}$), 1.45 ppm (O=CC$\underline{H_3}$ methyl group on oxidized hydroxypropyl chain), 1.12 ppm (C$\underline{H}$3, methyl group of hydroxypropyl group), $^{13}$C NMR (500 MHz, $D_2O$): 210 ppm C=O, 65-105 ppm (cellulose backbone+$CH_2$CH HP+CHz of terminal oxidized HP group), 25 ppm O=CC$\underline{H_3}$ (oxidized HP), 15 ppm $CH_3$ (HP), Ox-HPD: $^1$H NMR (500 MHz, $D_2O$): 3.10-5.40 ppm (cellulose backbone+O(C$\underline{H_2}$C$\underline{H_2}$O)$_m$C$\underline{H_2}$CR=O and HP group, C$\underline{H_2}$C$\underline{H}$, 2.33 ppm (terminal hydroxyl of un-oxidized HP group, O$\underline{H}$, 1.45 ppm (O=CC$\underline{H}$3 methyl group on oxidized HP chain), 1.12 ppm (C$\underline{H_3}$, methyl of HP group).

$^{13}$C NMR (500 MHz, $D_2O$): 178 ppm C=O, 162 ppm $CH_2$ (of terminal oxidized HP group), 100 ppm dextran C1, 60-82 ppm (dextran $C_2$-$C_6$+$CH_2$CH HP), 19 ppm O=CC$H_3$ ($CH_3$, oxidized hydroxypropyl), 16 ppm $CH_3$ (HP).

General Procedure for Reaction of Ox-HPC/Ox-HPD with Primary Amines

Ox-HPC (or Ox-HPD, 0.200 g, 0.48 mmol) was dissolved in 25 mL DMSO (reaction with PABA) or pH 6 phosphate buffer (t-butylamine). Primary amines were added at 2 eq per mmol of OH. The solution was stirred at room temperature for 72 h. The reaction mixture was then dialyzed against DI water and collected by freeze drying.

Ox-HPC-t-butylamine: $^1$H NMR (500 MHz, d6-DMSO): 2.80-4.75 ppm (cellulose backbone+OC$\underline{H_2}$C$\underline{H}$CH$_3$OH+N=CC$\underline{H_2}$), 2.12 ppm (N=CC$\underline{H_3}$), 1.25 ppm (NC(C$\underline{H_3}$)$_3$, t-butyl group), 1.15 ppm (C$\underline{H_3}$, methyl group of HP group). Yield=0.154 mg, 75%.

Ox-HPC-PABA: $^1$H NMR (500 MHz, d6-DMSO): $^1$H NMR (500 MHz, d6-DMSO): 7.61 ppm (ArC$\underline{H}$ ortho to carboxyl), 6.50 ppm (ArC$\underline{H}$ ortho to imine), 2.80-4.75 ppm (cellulose backbone+OC$\underline{H_2}$C$\underline{H}$CH$_3$OH+N=CC$\underline{H_2}$, 2.12 ppm (N=CC$\underline{H_3}$), 1.15 ppm (C$\underline{H_3}$, methyl group of HP group). Yield=0.167 g, 78%.

Dissolution Studies at pH 5

Dissolution studies in acidic (pH 5) media were conducted to study the rate of release of active molecule upon hydrolysis of the imine bond. Polymers (0.5 g) were dispersed in pH 5 phosphate buffer (100 mL) solution at 37° C. (physiological temperature) and stirred at 200 rpm for 8 hr.

Aliquots of 1 mL were taken at 30 min intervals for the first 2 h and then at 1 h intervals for 6 h. Samples were centrifuged and the supernatant analyzed by HPLC. Drug concentration was determined using a calibration curve.

Results

Figure 4:
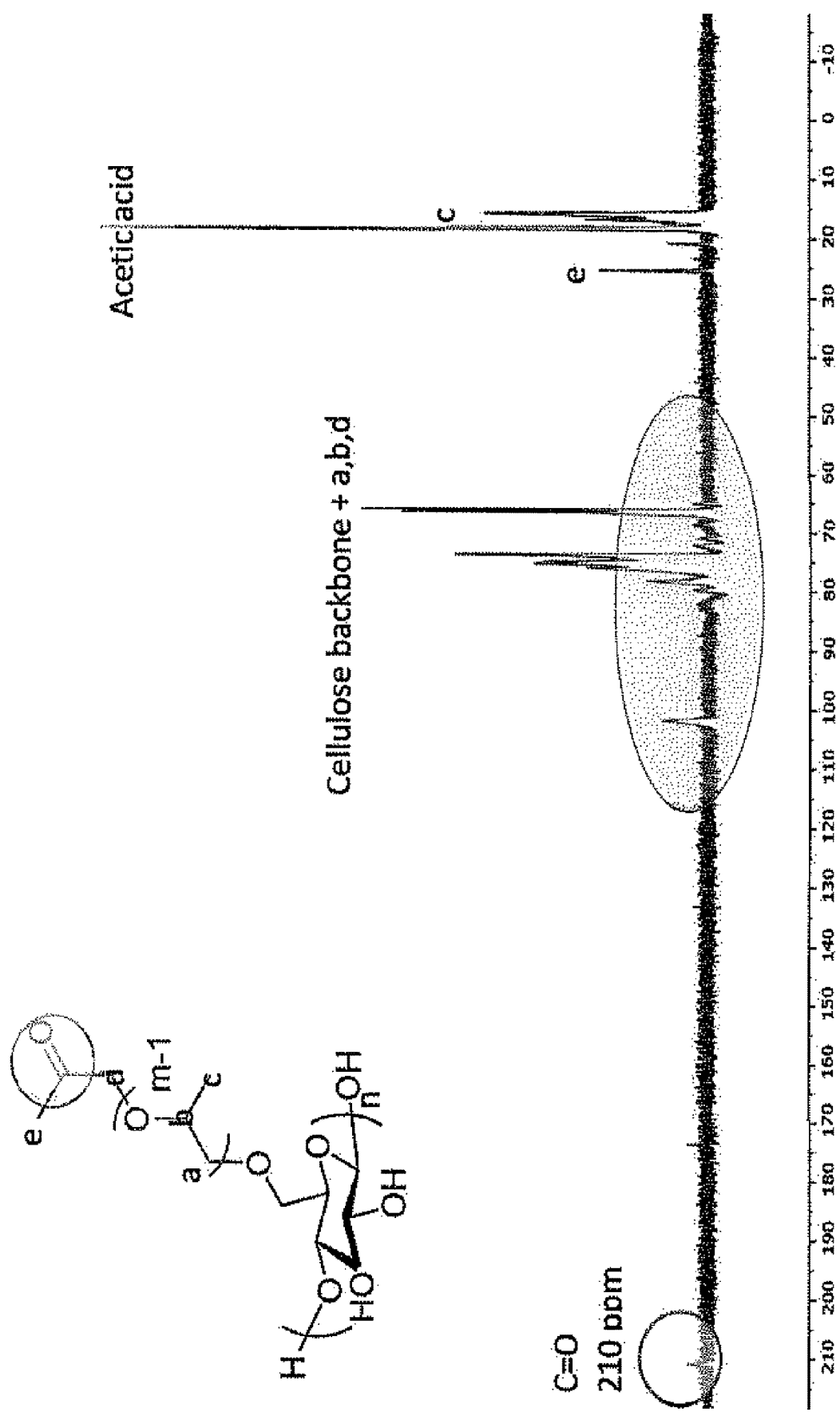
FIG. 4 is a $^{13}$C NMR spectrum of Ox-HPC according to an embodiment.

The present inventors provide proof of concept by selectively oxidizing secondary alcohol groups on hydroxypropyl cellulose to ketones. The $^{13}$C NMR (FIG. 4) spectra shows the resulting ketone carbonyl at 210 ppm. In contrast, carboxyl carbonyl carbons of oxidized primary hydroxyl groups (for example of hydroxyethyl cellulose) resonated in the range of 178-180 ppm in previous studies in the present inventors' lab. The present inventors would expect to see a C=O peak in this range for any oxidized free hydroxyls at the C-6 position, and no such carboxyls are observed in the $^{13}$C spectrum.

Figure 5:
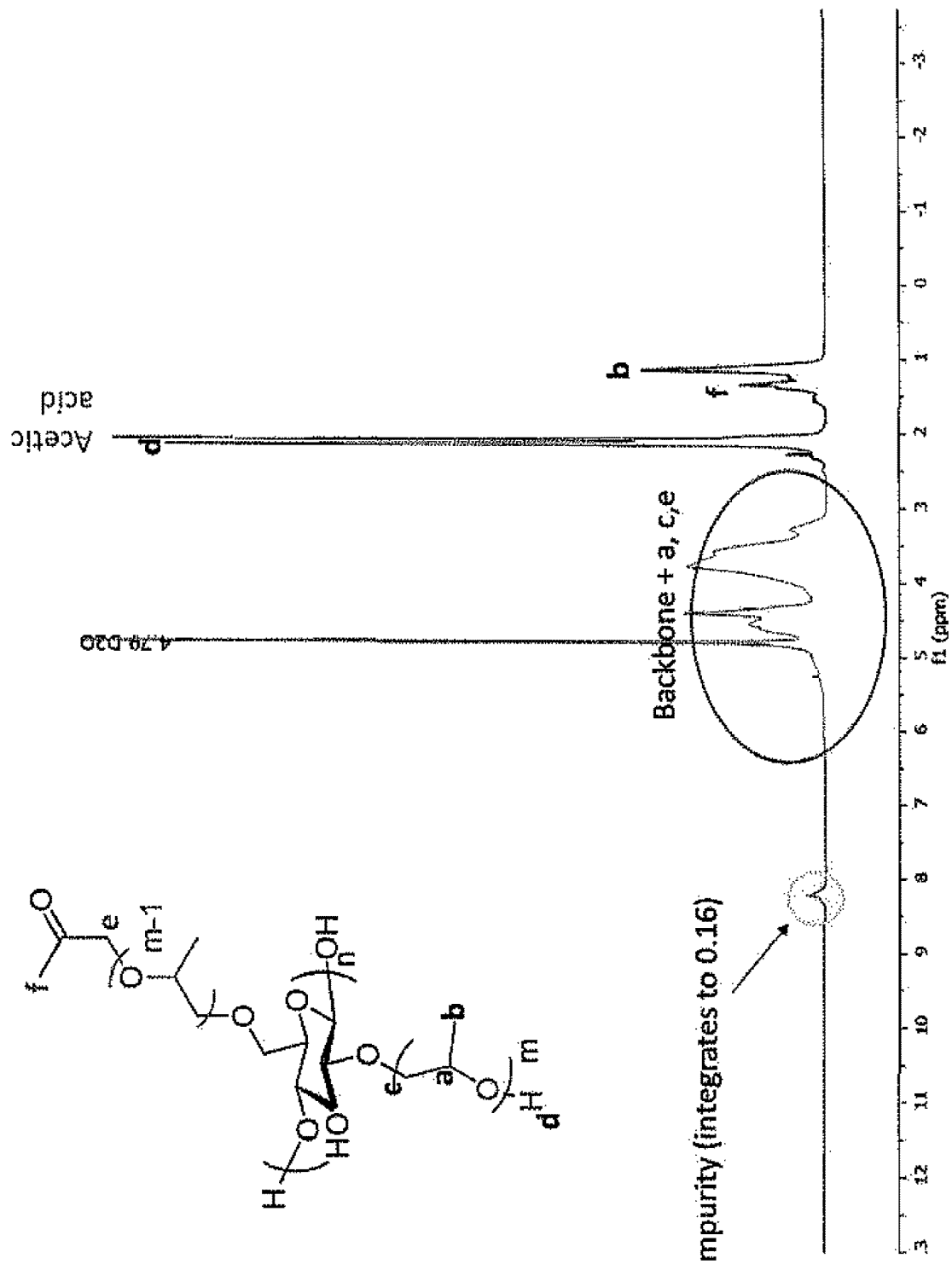
FIG. 5 is a $^1$H NMR spectrum of Ox-HPC according to an embodiment.

The $^1$H NMR spectrum (FIG. 5) shows that some secondary alcohols are not oxidized. This sample was oxidized for 8 h; in other experiments the present inventors have demonstrated that complete oxidation is achievable by increasing the reaction time to 24 h. Thus, oxidation of the terminal secondary alcohols of the HP groups to ketones is entirely controllable by reaction stoichiometry (and by reaction time), that is by the number of NaOC equivalents used per terminal HP group.

Figure 6:
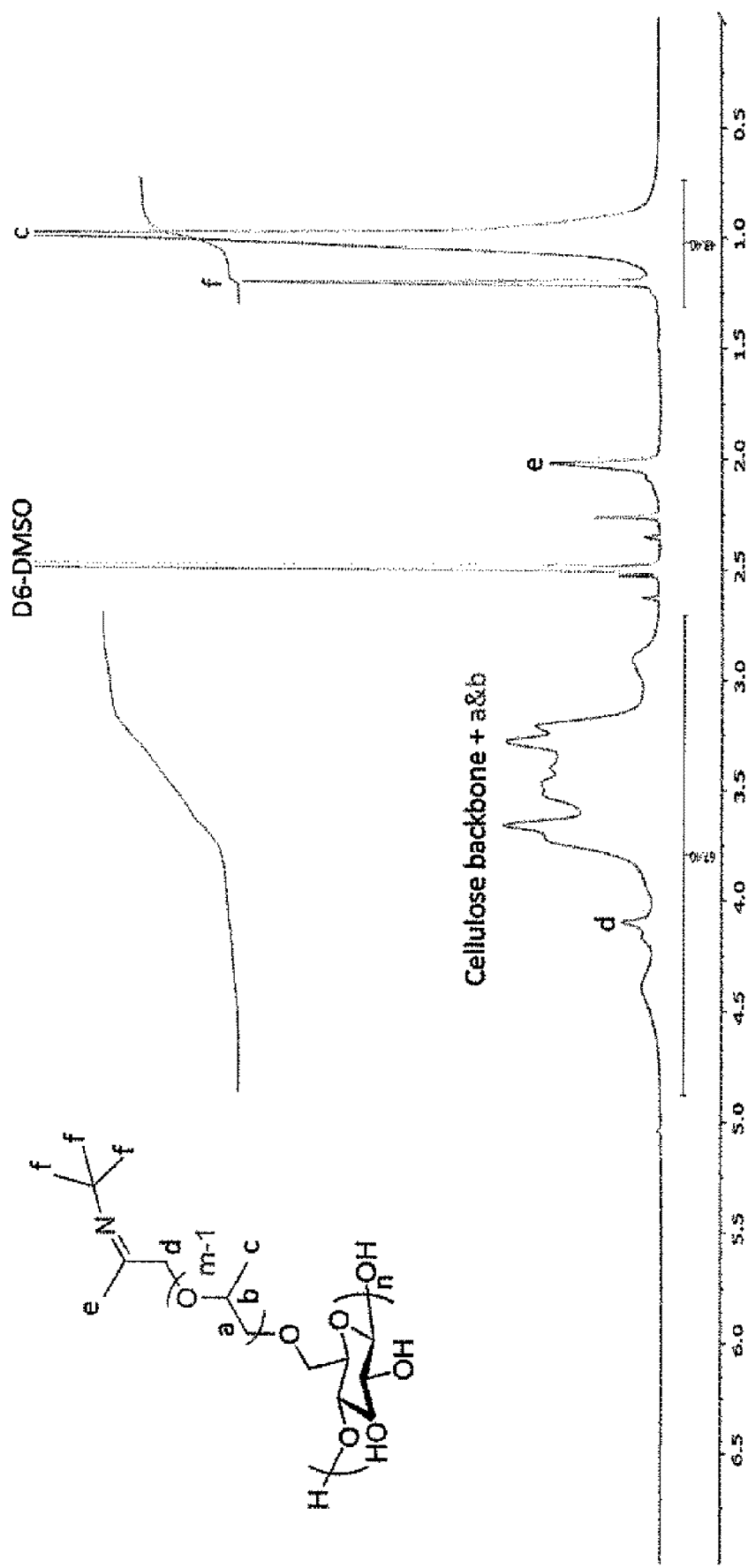
FIG. 6 is a $^1$H NMR spectrum of Ox-HPC-t-butylamine according to an embodiment.
Figure 7:
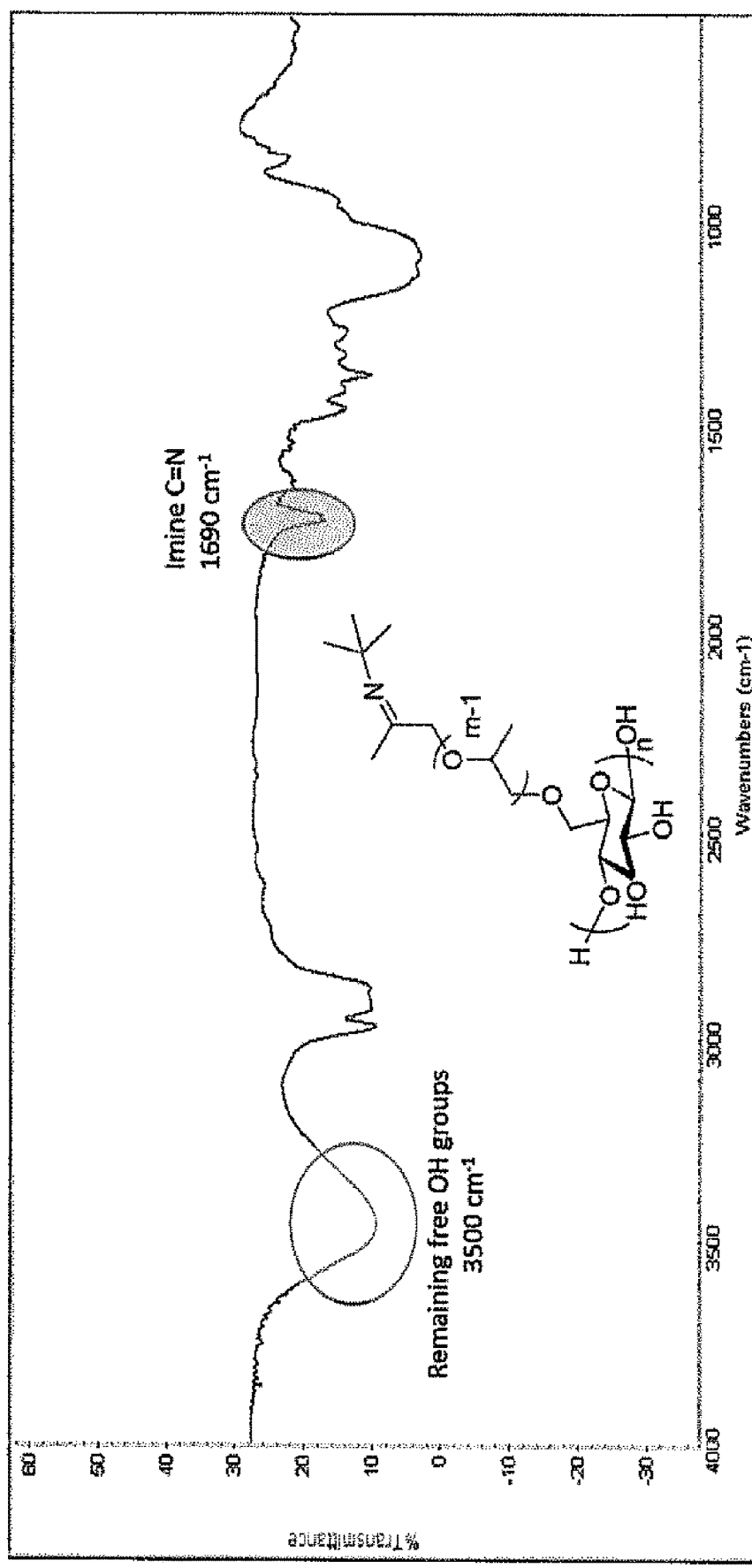
FIG. 7 is a FTIR spectrum of Ox-HPC-t-butylamine according to an embodiment.

Ox-HPC-t-butylamine was synthesized by reacting Ox-HPC and tert-butylamine. $^1$H NMR (FIG. 6) and FTIR (FIG. 7) spectra confirmed that a Schiff base imine bond was formed between the ketones located on Ox-HPC and the primary amine of tert-butylamine. The present inventors calculated the degree of substitution (DS) for the conjugated t-butylamine to be 0.15.

The FTIR spectrum shows the imine C=N at 1690 cm$^{-1}$, and also indicates the remaining free hydroxyl groups at 3500 cm$^{-1}$.

Figure 8:
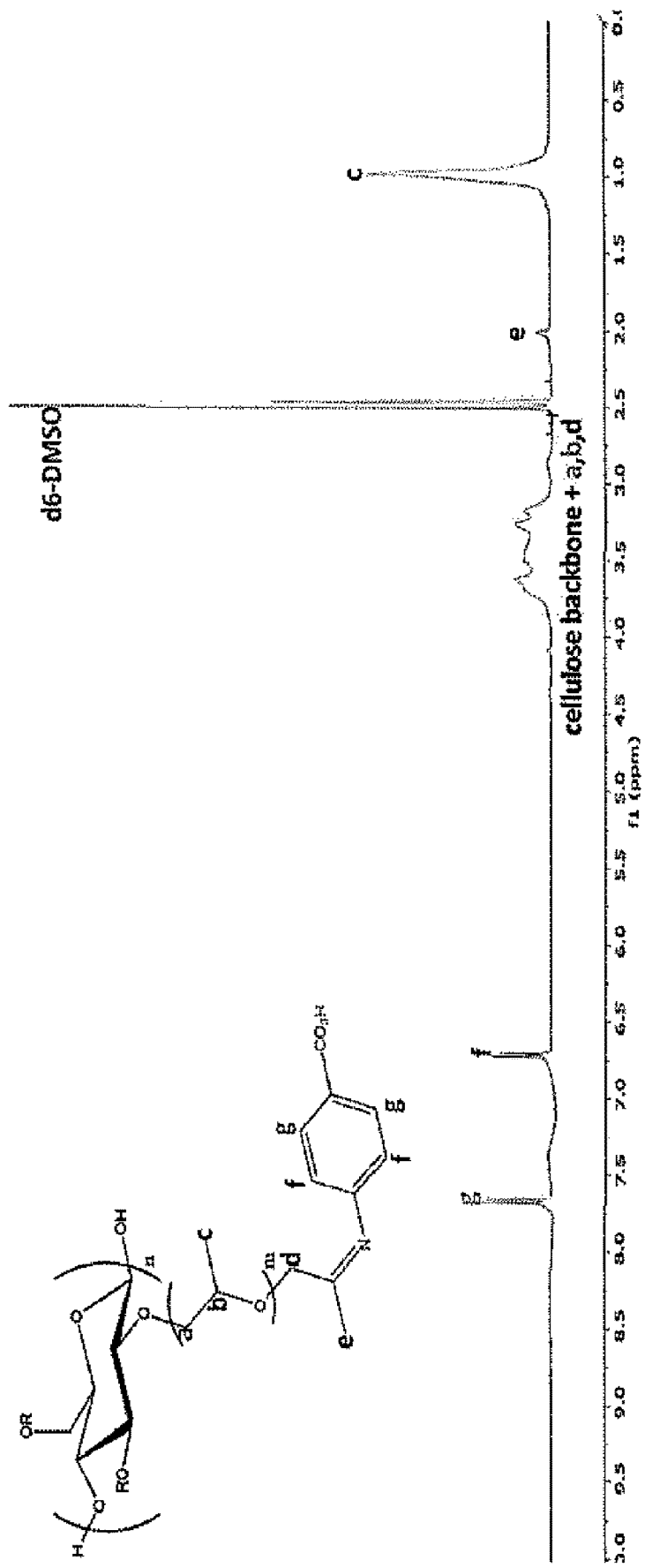
FIG. 8 is a $^1$H NMR of Ox-HPC-p-aminobenzoic acid according to an embodiment.

The present inventors used similar methodology with p-aminobenzoic acid (PABA) as the primary amine to prepare a model drug conjugate with Ox-HPC. The product had DS (PABA)=0.25 which was calculated utilizing the ratio of integration of the aromatic peaks f and g to the cellulose backbone (FIG. 8).

In addition to hydroxypropyl cellulose, the present inventors also explored the selective oxidation of hydroxypropyl dextran (HPD) with DS (HP)=0.9 determined by acetylation followed by $^1$H NMR spectroscopy. The present inventors confirmed successful NaOCl oxidation by FTIR, which shows a strong C=O peak at 1690 cm$^{-1}$. The application of this chemistry to dextran will provide added utility in biomedical applications. Unlike cellulose, dextran is biodegradable under physiological conditions. The effect of improved water solubility for dextran-drug conjugates has been demonstrated with therapies including nystatin (antifungal) and acyclovir (antiviral) (see Domb, A. J., Synthesis and biological activity of nystatin-dextran conjugates. *Proc. Int. Symp. Control. Release Bioactive Mater.* 1995, 22, 744-745; and Tu, J., Studies on acyclovir-dextran conjugate: Synthesis and pharmacokinetics. *Drug Develop. Indust. Pharm.* 2004, 30, 959-965). This makes oxidized HPD extremely useful for conjugation with drugs and proteins while maintaining excellent water solubility. Utilizing the secondary hydroxyl groups of HPD for Schiff base conjugation provides an inexpensive, mild and commercially feasible route to expand the use of these materials.

All Polysaccharide-Based Hydrogels

In this disclosure, the present inventors prepared non-toxic, polysaccharide-based hydrogels that have potential for use in a broad range of applications, include those sensitive to leaching of toxic crosslinkers. Furthermore, these polysaccharide-based hydrogels exhibit self-healing properties. Self-healing is defined as the property of a material in which, if damaged, the material can return to its former form without the need for outside repair or intervention. Self-healing is a very beneficial property since it can greatly enhance the durability, reliability, and life-time of the material.

According to embodiments, the present invention provides novel, non-toxic, self-healing polysaccharide-based hydrogels and methods for preparing such hydrogels. In one embodiment, the present invention provides a method for the production of a solid capable of forming a hydrogel, comprising: 1) combining a first solution comprising an oxidized oligo(hydroxypropyl) polysaccharide bearing one or more ketone groups with a second solution comprising an amine-substituted polysaccharide to form a third solution; and 2) removing solvent from the third solution to form the solid or adding an additional solvent to the third solution to precipitate the solid.

The novel hydrogel formation methods require no small molecule or polymeric crosslinker, and only require two modified polysaccharide polymers, one an oxidized oligo(hydroxypropyl) polysaccharide, in which the terminal hydroxypropyl monomer with its free secondary hydroxyl group is oxidized to a ketone. Further provided within the scope of the invention include other polysaccharides bearing substituents with secondary hydroxyl groups (an example would be 3-hydroxybutyl ethers of cellulose) which can serve as suitable crosslinking substrates. Further, the amine partner for making the hydrogel can be any amine-substituted polymer. In particular, the amine partner can be an amine substituted polysaccharide. Most especially, the amine partner can be a chitosan with DS(Ac) such that there are many unsubstituted amine groups along the chain. Further embodiments of the invention encompass hydrogel formation processes as well. In one example, the ketone-containing polysaccharide (oxidized hydroxypropyl dextran or oxidized hydroxypropyl cellulose, for example) is dissolved in water, and the chitosan is dissolved in water containing an acid (e.g. acetic acid). The solutions are combined, then the solvents are evaporated (e.g. by freeze drying). Then the resulting solid is added to water, quickly forming the desired hydrogel. Clearly this method is of interest for a dry material that would lend itself to formation of the hydrogel on demand and on site, eliminating the need to transport water around. Another example of a hydrogel formation process employs water-soluble chitosan compositions, such as low molecular weight chitosan (e.g. 10,000 molecular weight) with medium DS(Ac) (e.g., DS 0.5). In this second method, chitosan is dissolved in water to form solution A, and the oxidized hydroxypropyl polysaccharide is dissolved in water to form solution B. Then solutions A and B are combined and the hydrogel forms quickly. This method could be useful for forming the hydrogel, for example, in vivo, by simultaneous injection of the two solutions into the target site in the body.

The inventive hydrogels are linked by imine bonds, which are labile and dynamic in water. Formation of the imine bond liberates only benign water as by-product, and the reverse reaction can hydrolyze the imine linkage. For this reason, the hydrogels are self-healing, as the inventors demonstrate with visual and rheological data. This self-healing property is highly valuable for enhancing hydrogel durability in the body or in the environment. Hydrolysis of the hydrogel generates only the starting polysaccharides, chitosan and an oxidized hydroxypropyl polysaccharide. Chitosan has relatively low toxicity and breaks down in the human body, such that it can be cleared from the body (it also breaks down and mineralizes in the environment). The oxidized oligo(hydroxypropyl) polysaccharide can be selected for low toxicity and the ability to break down and clear from the body. For example, dextran is safe for use in the body (and is frequently administered intravenously to hospitalized patients). So long as the degree of hydroxypropylation is controlled to an adequately low level, unsubstituted glucose monosaccharides will remain in the chain and can be loci of degradation by amylase and other enzymes. Thus, embodiments of the present invention allow for the use of benign, degradable polymers that are biocompatible with many tissues and in many situations.

Other applications of the inventive hydrogels include delivery of drugs or other bioactive molecules, for example bioactive molecules that bear amine groups. Thus, amine-substituted bioactive molecules can be reacted with some of the ketone groups on the oxidized oligo(hydroxypropyl) polysaccharide, being careful to leave some unreacted ketones. Then this bioactive-appended polysaccharide can be reacted with chitosan to form a hydrogel that bears bioactive molecules linked by imine bonds. Since these imines are labile to hydrolysis, the hydrogel will release the bioactive molecule slowly into the surrounding tissue or medium. The present inventors have demonstrated appending the model compound t-butyl amine to oxidized oligo(hydroxpropyl) cellulose, and also the drug model p-aminobenzoic acid. These all-polysaccharide hydrogels, including bioactive-loaded derivatives as the present inventors describe here, have great utility in many application fields. Such applications include controlled release of drugs, crop protection chemicals, nutraceuticals, and other active compounds. Other applications include use in personal care formulations. Additional applications include use in surgical applications, for example for space filling in eye surgery, to prevent post-surgical adhesions in abdominal surgery, or for placing in sites of surgical tumor removal, for example brain tumor surgery, with anti-cancer drugs appended so as to mop up residual malignant cells. The inventive hydrogels can be used in agriculture, where application to a seed or around a young plant can allow local, targeted application of fertilizer and/or crop protection chemicals and minimize leaching that could threaten the environment. The benign nature of the inventive hydrogels makes them ideal for personal care or cosmetic applications.

The inventors' hydrogel formation chemistry can be used for essentially any polysaccharide that can be hydroxypropylated. This would include cellulose, amylose, dextran, chitin, chitosan, alginate, pullulan, curdlan, hyaluronic acid, and many others. Other substituents can be present as well; for example, one could begin with commercial ethyl cellulose or methyl cellulose, then hydroxypropylate as taught herein, then oxidize as taught herein. The hydrogel formation chemistry can encompass a wide variety of amine-containing polymers, aminopolysaccharides, and chitosans. The appended bioactive molecule need only have an amine group capable of reaction with the ketone substituent of the oxidized oligo(hydroxypropyl) polysaccharide.

All Polysaccharide-Based Hydrogels: Example

According to one example, non-toxic, self-healing hydrogels were prepared by reacting chitosan with oxidized hydroxyl propyl cellulose (OX-HPC) and oxidized hydroxyl propyl dextran (OX-HPD). The gel formation and self-healing property of OX-HPC-Chitosan was assessed by a series of rheological studies.

Figure 9A:
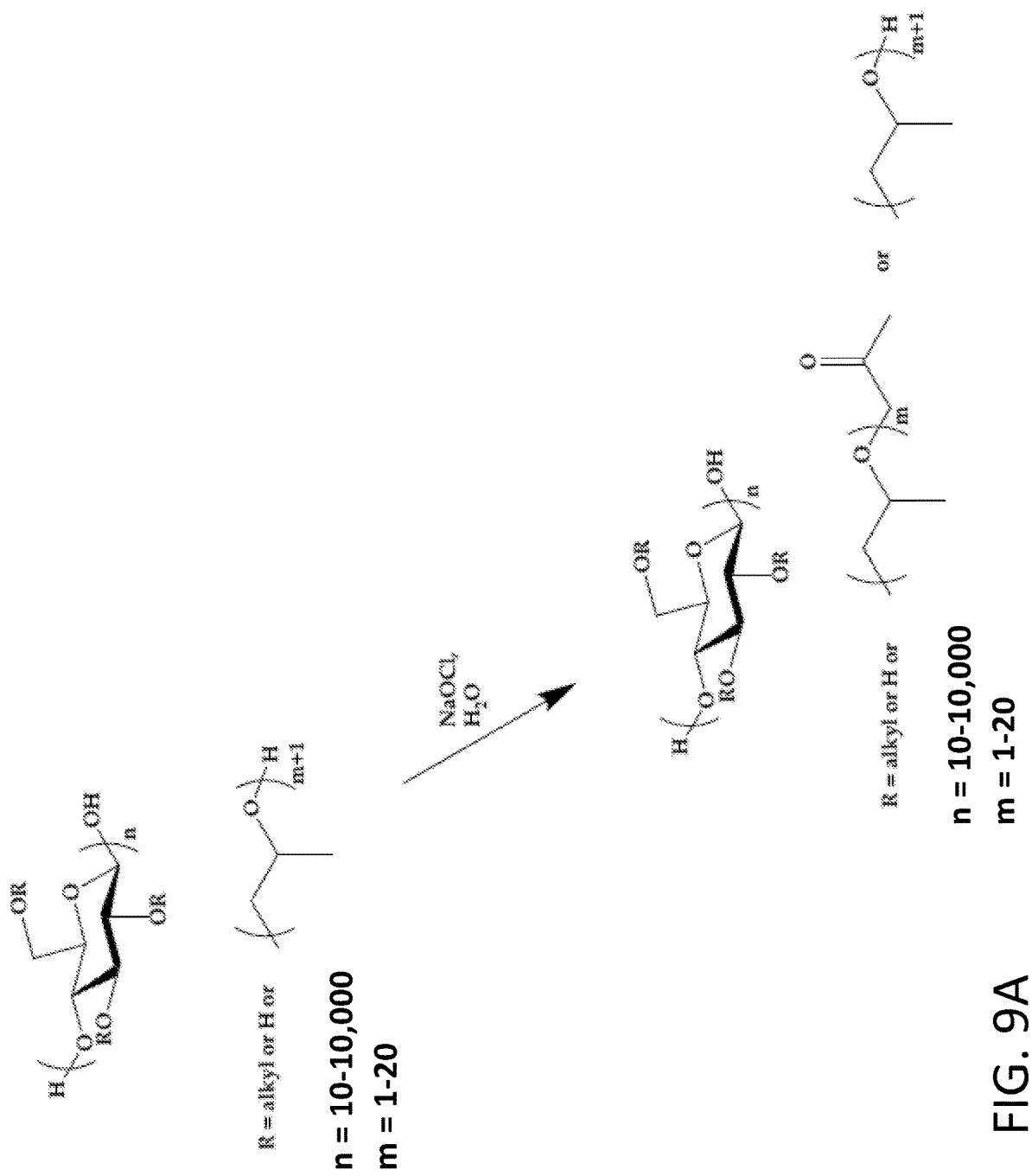
FIG. 9A is a schematic diagram showing a generalized reaction scheme for the reaction shown in FIG. 9B, based on a generic polysaccharide starting material.
Figure 9B:
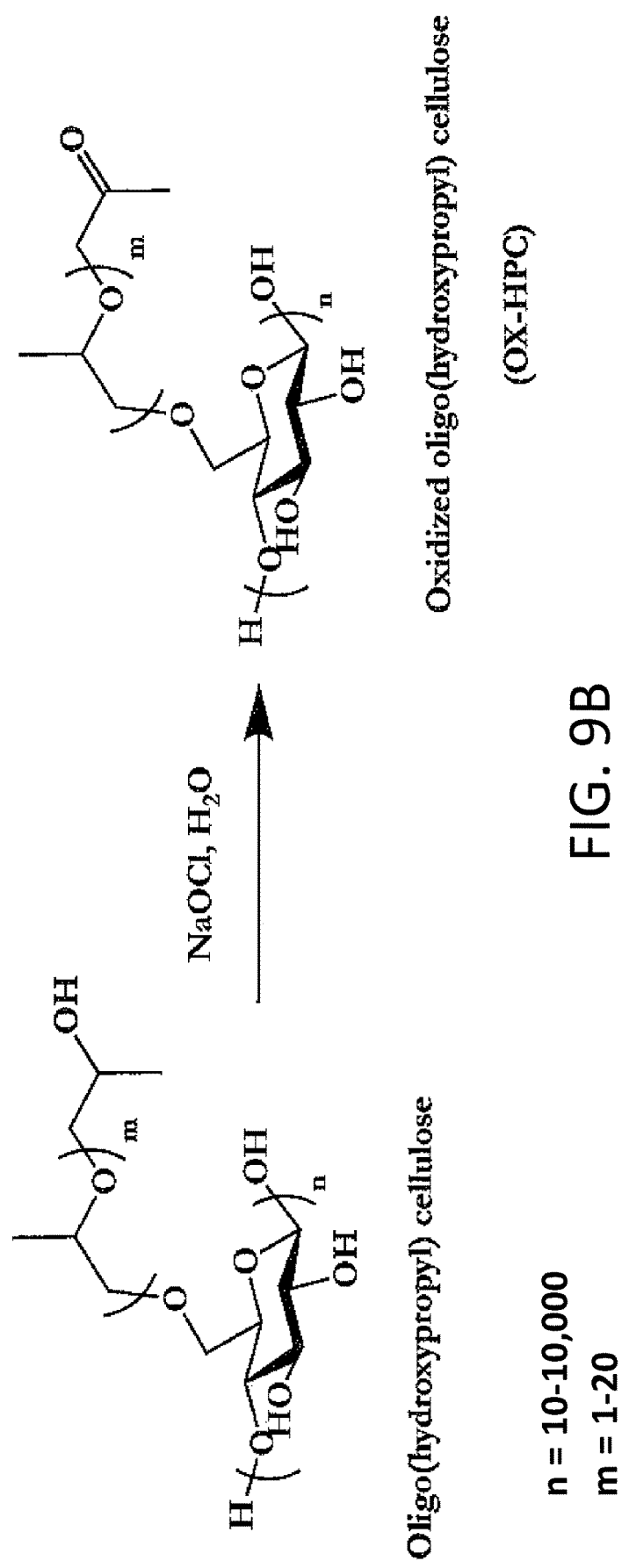
FIG. 9B is a schematic diagram of oxidation of HPC to prepare oxidized oligo(hydroxypropyl) cellulose according to an embodiment.

In this example, novel polysaccharide-based hydrogels were crosslinked by imine linkages. The present inventors used oxidized hydroxypropyl polysaccharides with ω-ketone functionalities on the oligo(hydroxypropyl) side chains, recently invented in their laboratory, as one partner. The methodology for preparing these oxidized oligo(hydroxypropyl) polysaccharides is shown by example in FIG. 9B for clarity; FIG. 9A shows a generalized reaction scheme based on a generic polysaccharide starting material. For example, the polysaccharide can be cellulose containing oligo(hydroxypropyl) groups that are terminally oxidized to ketones (e.g. DS 0.1-1.5, most preferred 0.5-1) as represented in FIG. 9A, or can contain either methyl or ethyl ethers (e.g. DS 0.5-1.5, most preferred 0.7-1.3). The polysaccharide can also be based on dextran or any other polysaccharide recited herein instead of cellulose. The cellulose or dextran can contain oligo(hydroxypropyl) groups where the terminal alcohol is oxidized to ketone (e.g. DS 0.1-1.5, most preferred 0.5-1) as represented in FIG. 9A, but can also contain ester groups such as acetate, propionate, butyrate esters (e.g. DS 0.5-1.5, most preferred 0.7-1.3). For example, whichever glucose ring hydroxyls are not substituted with oligo(hydroxypropyl) groups that are terminally oxidized to ketones, can be substituted with either R=H or R=(acetyl, propionyl, or butyryl), with the requirement that at least some of the R's are ester groups.

Figure 10:
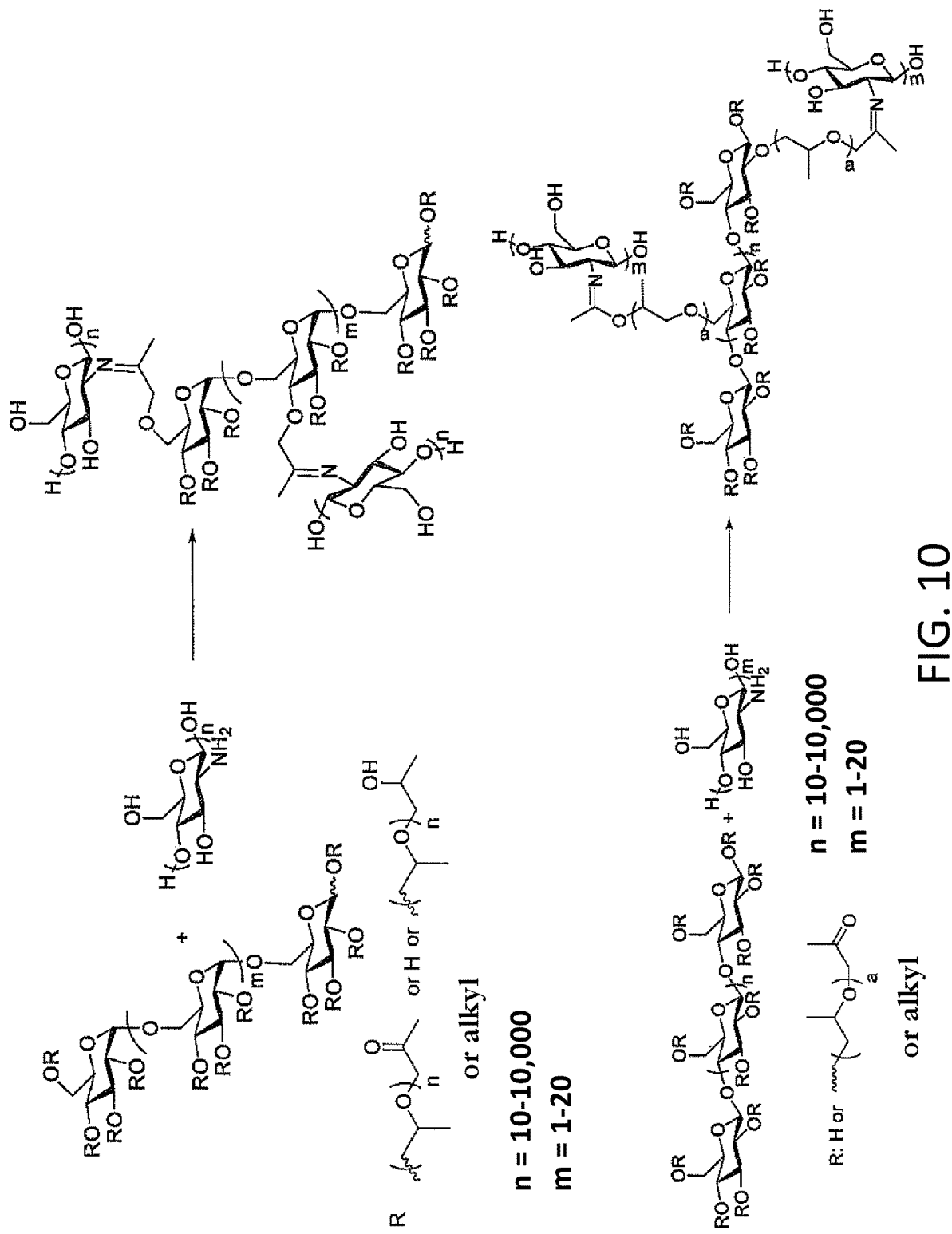
FIG. 10 is a schematic diagram showing formation of OX-HPC-Chitosan and OX-HPD-Chitosan hydrogels according to an embodiment.

In particular, the present inventors used oxidized hydroxypropyl cellulose (OX-HPC), prepared from commercial hydroxypropyl cellulose (HPC) of DS(HP) 2.2, and MS(HP) 4.4) and oxidized hydroxypropyl dextran (OX-HPD), prepared from hydroxypropyl dextran (HPD) of DS(HP) 1.4, and MS(HP) 1.4) as the initial ketone partners for the imine formation reaction. Chitosan (M. 50,000-190,000 g/mol, 75%-85% deacetylated) was used as the amine partner. Both OX-HPC and OX-HPD can be prepared as aqueous solutions. High molecular weight and/or low DS(Ac) chitosan can dissolve in water containing an acid, for example acetic acid. In order to prepare the polysaccharide based hydrogel, the OX-HPC or OX-HPD aqueous solution was mixed with the solution of chitosan in aqueous acetic acid (the general reaction is shown in FIG. 10; as shown, the polysaccharide can have alkyl groups; the ketone containing polysaccharide can be any known polysaccharide; chitosan can have substituents, such has alkyl ethers). This afforded a solution, which was stirred at room temperature for 24 h. Solution gelation was not observed at this stage, which the present inventors attribute to the presence of the acetic acid, which impedes imine formation by partially protonating the chitosan amine groups. Polymers were precipitated by adding the solution to an excess of acetone. The white, rubbery product was collected and dried in vacuum oven to give brittle, white solid. Upon addition to water (no acetic acid present), this solid was rehydrated to rapidly form a hydrogel. This method can also be extended to other oligo(hydroxypropyl) polysaccharide derivatives and chitosan with different molecular weights and different DS(NH$_2$). Chitosan with relatively low molecular weight (ca. 10,000-20,000) and moderate DS(NH$_2$) (ca. 0.5) is soluble in water without need of added acid, so combination of water solutions of this chitosan and the oxidized oligo) hydropropyl) polysaccharide will form a hydrogel directly, thus being amenable to hydrogel formation in situ by simultaneous injection of the two solutions, for example.

Figure 11:
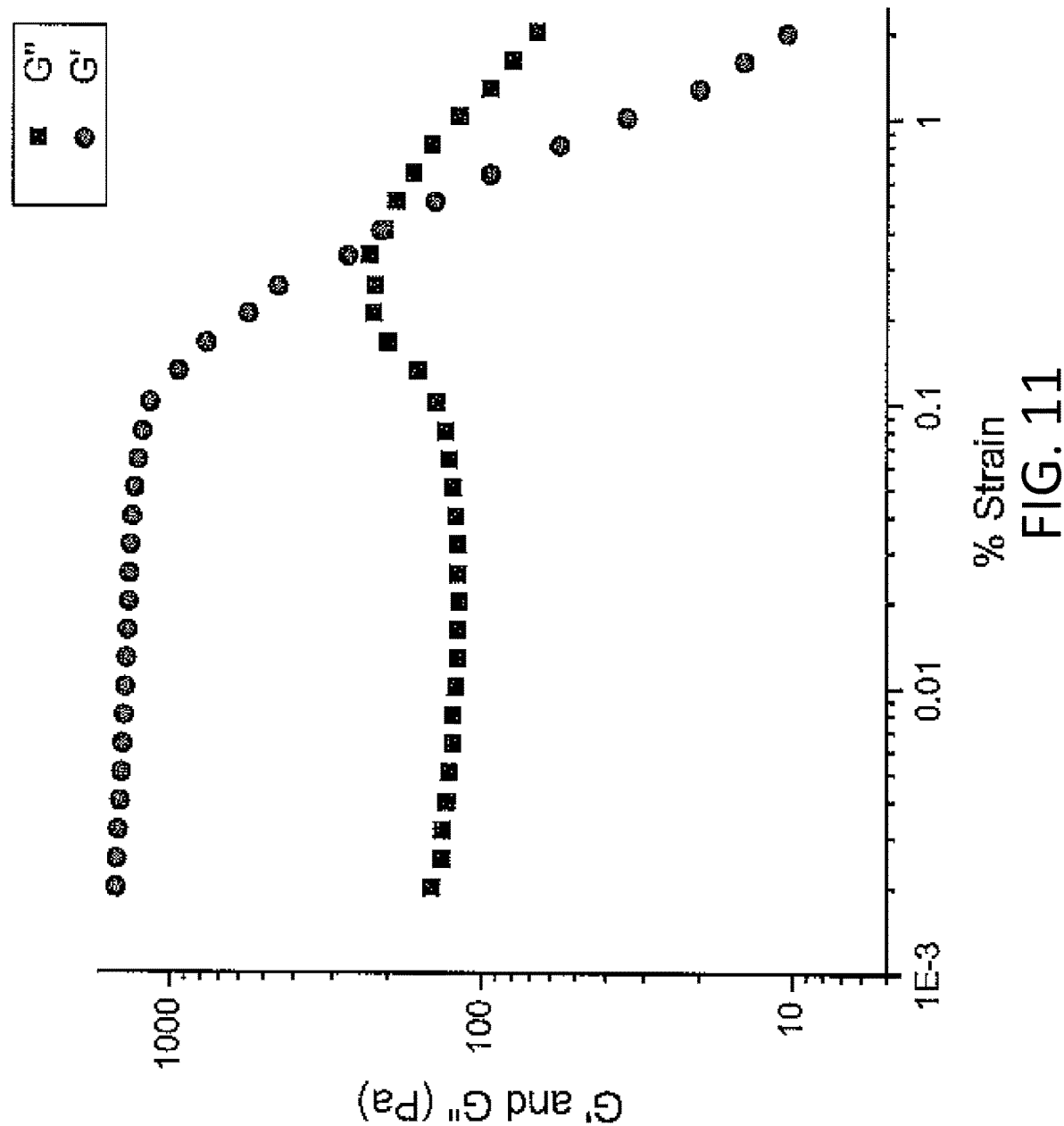
FIG. 11 is a graph showing strain sweep of OX-HPC-Chitosan hydrogel with 0.5 Hz frequency according to an embodiment.
Figure 12:
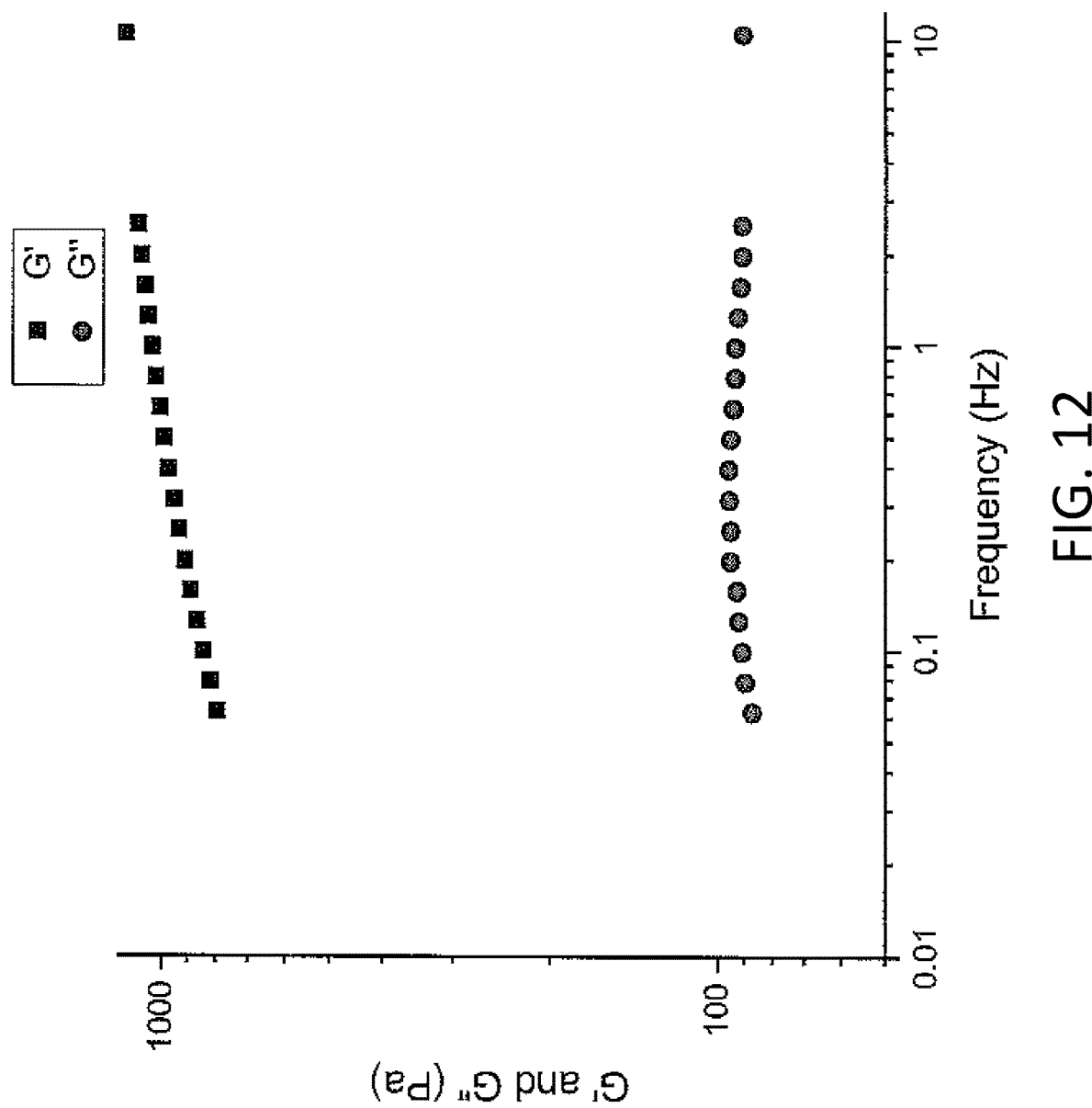
FIG. 12 is a graph showing frequency sweep of OX-HPC-Chitosan hydrogel with 1% strain according to an embodiment.

The polysaccharide hydrogels exhibit self-healing ability. To demonstrate self-healing, the hydrogel was cut into several pieces and these were placed adjacent to each other. After two hours, the boundaries between each hydrogel pieces were obscure. Gradually, small hydrogel pieces merged into a single piece of hydrogel. The following rheological analyses (FIGS. 11 and 12) also support the formation of a self-healing hydrogel.

Physical properties of these all-polysaccharide hydrogels are tunable by controlling the solid content. In the following examples, all the rheological analyses used an OX-HPC-Chitosan hydrogel with 1.5% solid content in water. All experiments were conducted on an AR2000 Rheometer at 25° C. on a 25 mm parallel plate with a gap of 1 mm. The strain sweep (FIG. 11) shows that the OX-HPC-Chitosan hydrogel exhibited a storage modulus of ca. 1400 Pa, and a linear viscoelastic region limit of 0.1% strain. This strain sweep illustrates that this hydrogel contains crosslinking networks.

The frequency sweep (FIG. 12) illustrates an unclear equilibrium plateau which is about 900 Pa. This phenomenon is normal for low stiffness materials, as inertia effects can result in unreliable G' and G" under high frequency. This frequency sweep also shows that the hydrogel stays in the gel-state in this frequency range (0.1-10 Hz).

Figure 13:
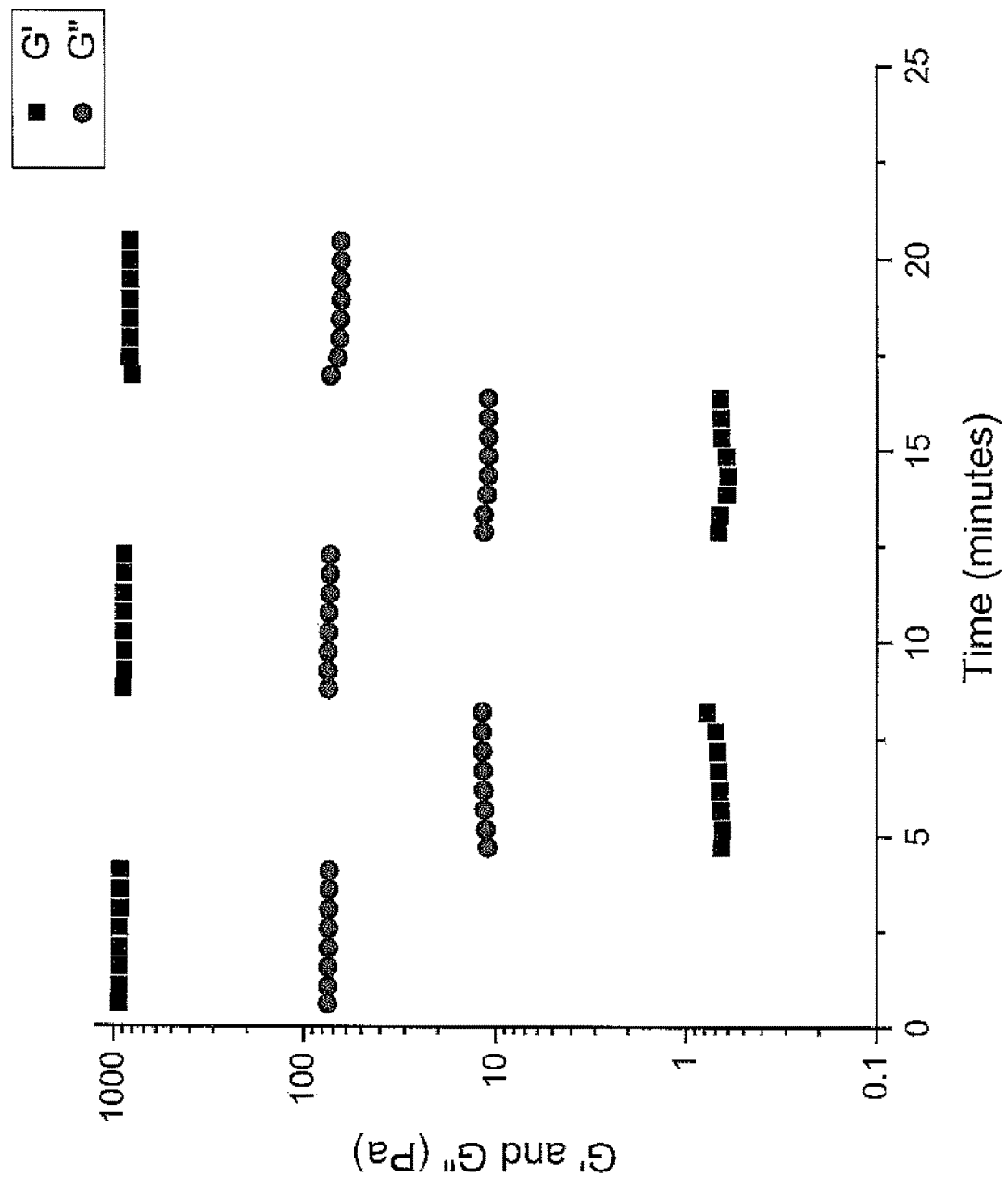
FIG. 13 is a graph showing step-strain time sweep of OX-HPC-Chitosan hydrogel with 0.2 Hz frequency according to an embodiment.

The self-healing nature of this hydrogel was confirmed by a step-strain time sweep (FIG. 13). In this test, the strain was alternated between 0.5% and 1000% in 4 minute segments. Based on the strain sweep result, this hydrogel can stay in the gel state at 0.5% strain and can be converted to a fluid at 1000% strain. In the first segment (0-4 min), storage modulus exceeded loss modulus, which indicates that the hydrogel is in a gel state. In the second segment (4-8 min), the strain increased to 1000% which destroyed the cross-linking network of this hydrogel. As a result, the loss modulus exceeded the storage modulus. In the third segment, the strain decreased to 0.5% and the hydrogel immediately returned to its original gel-state with a 1000 Pa storage modulus. This phenomenon clearly indicated the rapid self-healing property of this hydrogel. In the subsequent fourth and fifth segments the hydrogel perfectly repeated its self-healing behavior, showing the durability of the hydrogel and its self-healing behavior. These results also illustrate that the hydrogel contains a dynamic crosslinking network.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for the production of a hydrogel, comprising:
combining a first solution comprising an oxidized hydroxypropyl polysaccharide bearing one or more ketone groups or an oxidized oligo(hydroxypropyl) polysaccharide bearing one or more ketone groups with a second solution comprising an amine substituted polysaccharide to form a third solution or hydrogel suspension;
removing solvent from the third solution or hydrogel suspension and forming a solid capable of forming a hydrogel, or adding an additional solvent to the third solution or hydrogel suspension, and forming the hydrogel.

2. The method of claim 1, wherein the oxidized polysaccharide is an oxidized hydroxypropyl or an oxidized oligo (hydroxypropyl) cellulose, amylose, dextran, chitin, chitosan, alginate, pullulan, curdlan, or hyaluronic acid.

3. The method of claim 1, wherein removing solvent from the third solution comprises freeze drying.

4. The method of claim 1, wherein the amine substituted polysaccharide is chitosan.

5. The method of claim 1, wherein:
the first solution comprises an oxidized hydroxypropyl cellulose (OX-HPC) or an oxidized hydroxypropyl dextran (OX-HPD) and the second solution comprises chitosan.

6. The method of claim 5, wherein the first solution comprises an oxidized hydroxypropyl dextran (OX-HPD) and the second solution comprises chitosan.

7. The method of claim 6, further comprising preparing a dextran-drug conjugate comprising the hydrogel or the solid capable of forming the hydrogel.

8. The method of claim 5, wherein the first solution comprises an oxidized hydroxypropyl cellulose (OX-HPC) and the second solution comprises chitosan.

9. The method of claim 8, further comprising preparing a pro-drug moiety comprising the hydrogel or the solid capable of forming the hydrogel.

10. The method of claim 5, wherein the OX-HPC or the OX-HPD comprises attached pro-active moieties, thereby creating a hydrogel capable of slow release of the active in water.

11. A hydrogel, which is represented as follows:
(a) for alginate oxidized hydrogels:

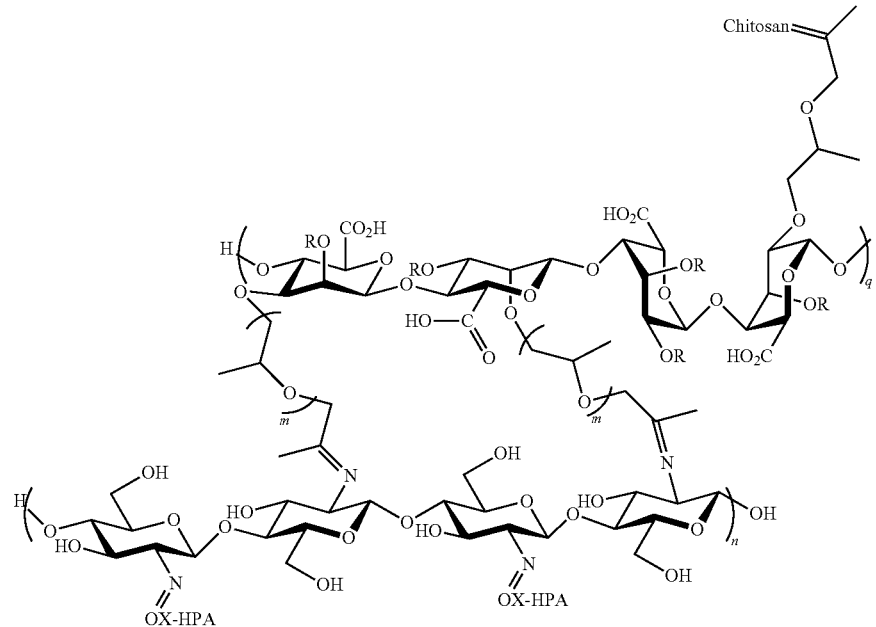

where:
R=

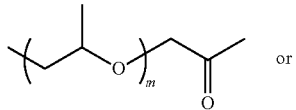

or

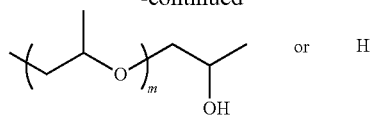
q=0-20
n=10-10,000
m=10-1,000;
(b) for amylose oxidized hydrogels:
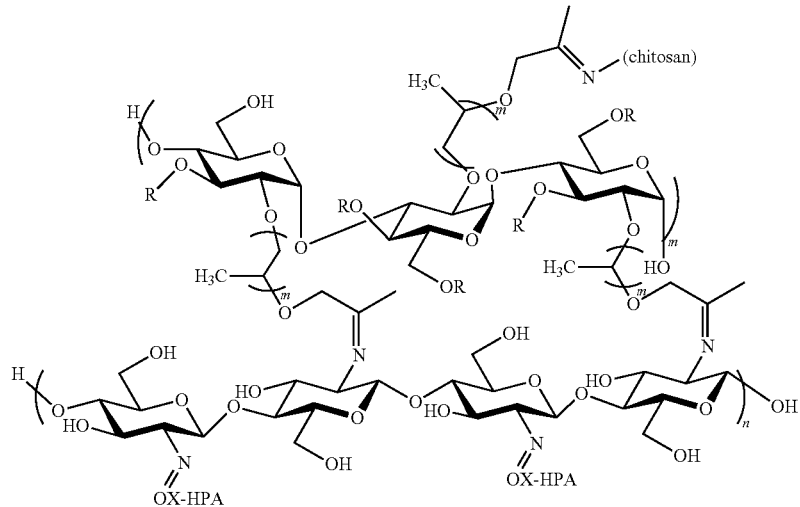
where R, m, n, and q are defined as above;
(c) for chitosan oxidized hydrogels:
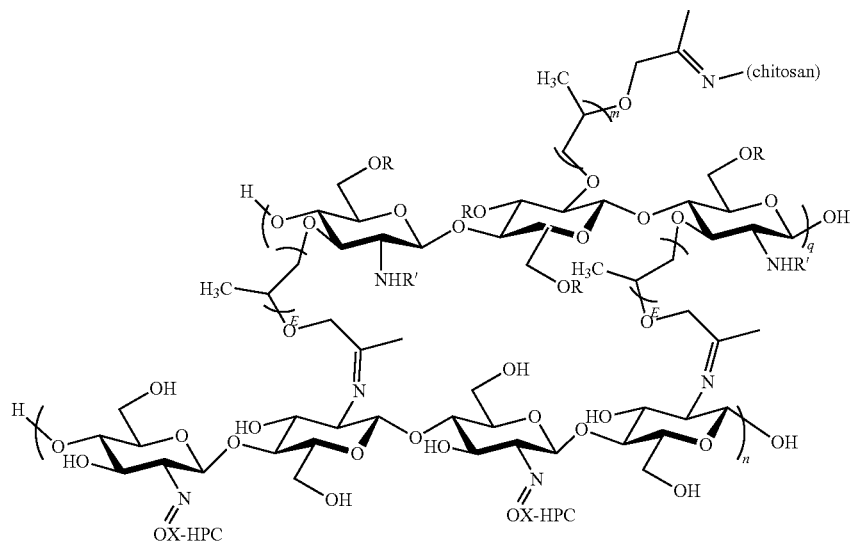
where R'=Acetyl or H; and
where R, m, n, and q are defined as above;
(d) for curdlan oxidized hydrogels:

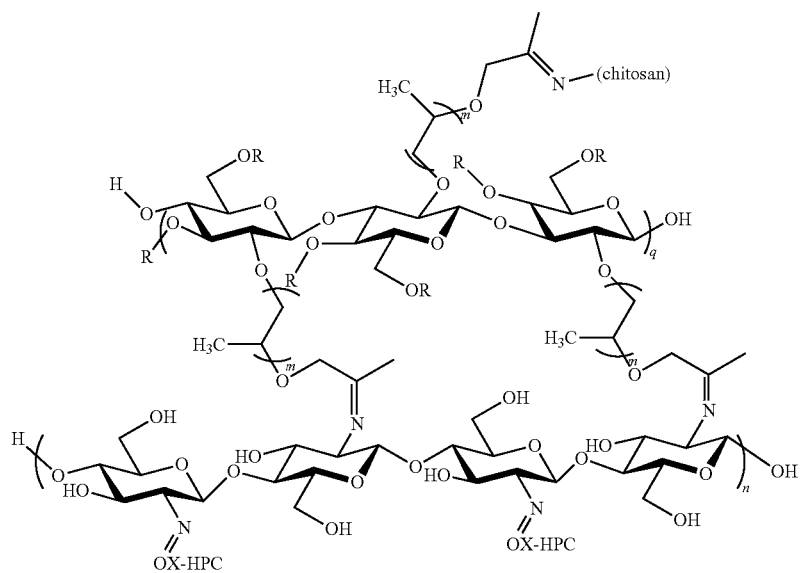
where R, m, n, and q are defined as above;
(e) for dextran oxidized hydrogels:
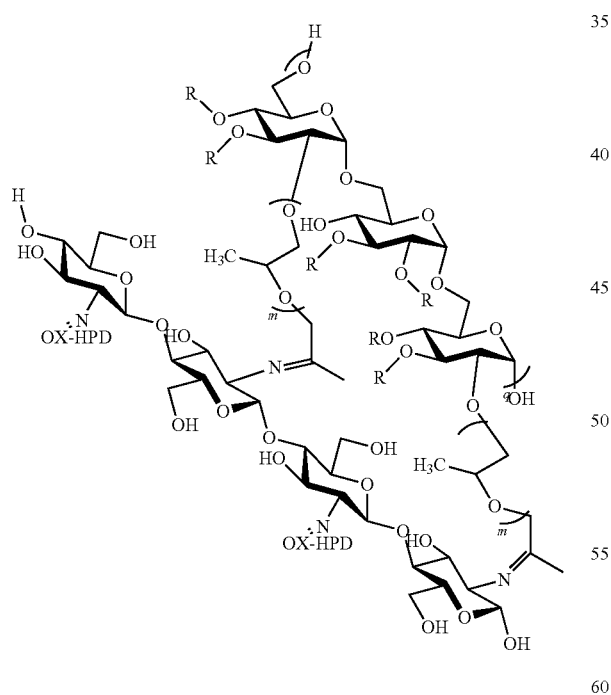
where R, m, n, and q are defined as above;
(f) for hyaluronic acid oxidized hydrogels:

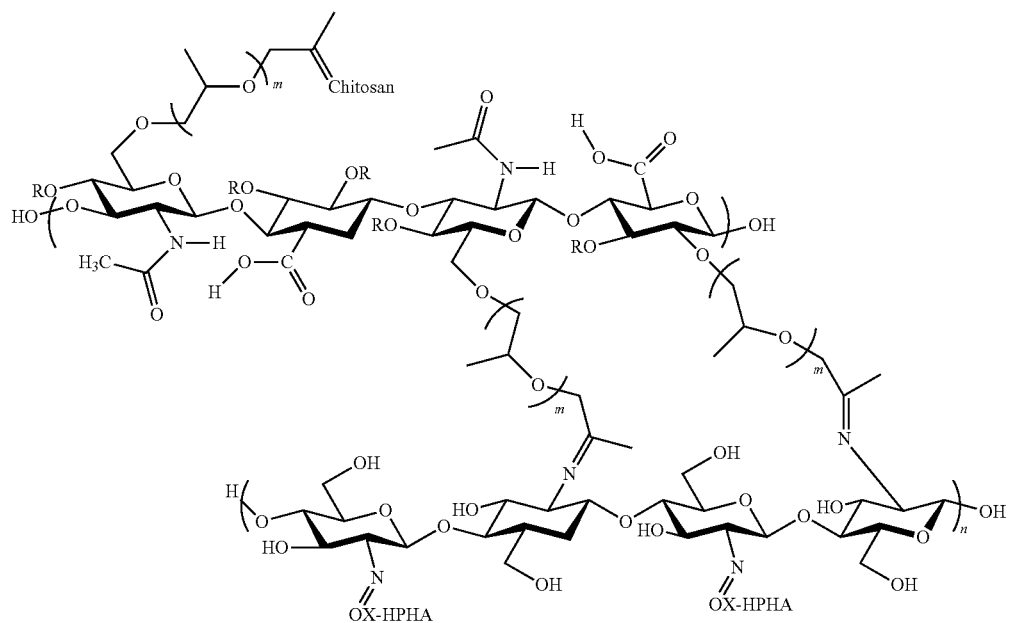
where R, m, n, and q are defined as above;
(g) for pullulan oxidized hydrogels:
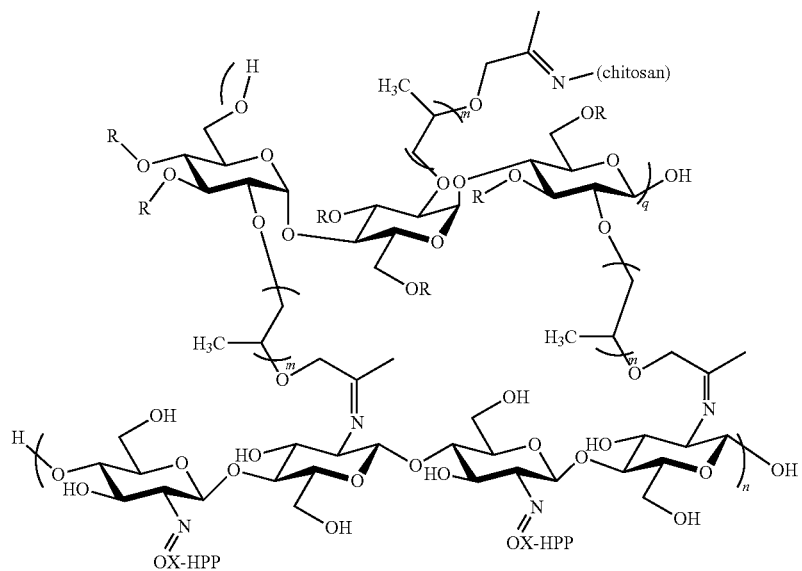
where R, m, n, and q are defined as above; and
wherein regioselective substitution is not implied, and alkyl groups, if present, hydroxypropyls, oligo(hydroxypropyls), oxidized hydroxypropyls, and oxidized oligo(hydroxypropyl)s are randomly distributed around each glucose ring.
* * * * *

UNITED STATES PATENT AND TRADEMARK OFFICE
CERTIFICATE OF CORRECTION

| | |
|---|---|
| PATENT NO. | : 11,384,161 B2 |
| APPLICATION NO. | : 16/961555 |
| DATED | : July 12, 2022 |
| INVENTOR(S) | : Kevin Edgar et al. |

It is certified that error appears in the above-identified patent and that said Letters Patent is hereby corrected as shown below:

In the Specification

Column 1, Line 16 and before the header "BACKGROUND OF THE INVENTION": insert the following:
--GOVERNMENT SUPPORT CLAUSE
This invention was made with government support under DMR1308276 awarded by the National Science Foundation. The government has certain rights in the invention.--

Signed and Sealed this
Ninth Day of May, 2023

Katherine Kelly Vidal
*Director of the United States Patent and Trademark Office*